(12) United States Patent  (10) Patent No.: US 9,744,703 B2
Kao et al.  (45) Date of Patent:  Aug. 29, 2017

| (54) | METHOD OF MANUFACTURE INSULATING ELECTRICAL PLUGS |
|---|---|
| (71) | Applicant: STANDARD CABLE USA, INC., Rancho Santa Margarita, CA (US) |
| (72) | Inventors: Selvin Kao, Ladera Ranch, CA (US); Philip Carlo J. DeGuzman, Fontana, CA (US) |
| (73) | Assignee: STANDARD CABLE USA, INC., Rancho Santa Margarita, CA (US) |
| ( * ) | Notice: Subject to any disclaimer, the term of this patent is extended or adjusted under 35 U.S.C. 154(b) by 638 days. |
| (21) | Appl. No.: 14/198,199 |
| (22) | Filed: Mar. 5, 2014 |
| (65) | Prior Publication Data |
|  | US 2015/0255941 A1  Sep. 10, 2015 |
| (51) | Int. Cl. |
|  | *B29C 45/14* (2006.01) |
|  | *H01R 13/504* (2006.01) |
|  | *H01R 24/30* (2011.01) |
|  | *H01R 43/24* (2006.01) |
|  | *B29L 31/36* (2006.01) |
|  | *H01R 103/00* (2006.01) |
| (52) | U.S. Cl. |
|  | CPC ..... *B29C 45/14639* (2013.01); *H01R 13/504* (2013.01); *H01R 24/30* (2013.01); *H01R 43/24* (2013.01); *B29L 2031/36* (2013.01); *H01R 2103/00* (2013.01) |
| (58) | Field of Classification Search |
|  | CPC .............................................. B29C 45/14639 |
|  | See application file for complete search history. |

(56) References Cited

U.S. PATENT DOCUMENTS

| 3,611,257 A | 10/1971 | Carkhuff |
|---|---|---|
| 4,010,999 A | 3/1977 | Hoffman |
| 4,418,978 A | 12/1983 | Shamir |
| (Continued) | | |

FOREIGN PATENT DOCUMENTS

| EP | 1326307 A2 | 7/2003 |
|---|---|---|
| EP | 1892801 B1 | 9/2009 |

OTHER PUBLICATIONS

Rees, Herbert. Mold engineering. Hanser Verlag, 2002. 2nd Ed. pp. 189-198.*

(Continued)

*Primary Examiner* — Benjamin Schiffman
(74) *Attorney, Agent, or Firm* — Innovation Capital Law Group, LLP; Vic Lin

(57) ABSTRACT

Electrical plugs having single and double insulation as well as the method for manufacturing the double insulating electrical plugs are disclosed. The single insulated electrical plugs have internal walls which electrically isolate the electrical connectors. The single insulated electrical plug has a one-piece body with a central base which accepts the electrical connectors, as well as two covers hingably coupled to the base to secure the connectors in place. The double insulated electrical plugs are insulated by both an inner body as well as the overmold material. The inner body has vents which enable overmold material to be injected into the inner portions of the inner body as well as onto the outside of the inner body. During the manufacturing process, molten material flows over the outside of the inner body, and also flows into the interior of the inner body to provide two layers of electrical insulation.

18 Claims, 34 Drawing Sheets

(56) References Cited

U.S. PATENT DOCUMENTS

| | | | |
|---|---|---|---|
| 4,574,474 A | 3/1986 | Langham | |
| 5,647,751 A | 7/1997 | Shulman et al. | |
| 5,871,374 A | 2/1999 | Maney | |
| 5,971,733 A | 10/1999 | Huang | |
| 6,910,920 B2 | 6/2005 | Su | |
| 7,070,460 B1 | 7/2006 | Nagano | |
| 7,186,132 B2 | 3/2007 | Quintanilla | |
| 7,677,932 B2 | 3/2010 | King, Jr. et al. | |
| 7,771,214 B2 | 8/2010 | Wang et al. | |
| 8,410,363 B1 | 4/2013 | Baldwin et al. | |
| 9,142,911 B1* | 9/2015 | Kao | H01R 24/28 |
| 9,496,660 B2* | 11/2016 | Kao | H01R 24/28 |
| 2001/0024909 A1 | 9/2001 | Wakata et al. | |
| 2005/0239324 A1 | 10/2005 | Low et al. | |
| 2005/0260874 A1 | 11/2005 | Murakami et al. | |
| 2007/0149026 A1 | 6/2007 | Deja et al. | |
| 2008/0116105 A1* | 5/2008 | Statham | B29C 45/0013 206/534 |
| 2009/0239412 A1 | 9/2009 | Fukaya | |
| 2010/0130076 A1 | 5/2010 | Shrum et al. | |
| 2011/0097911 A1 | 4/2011 | Lee et al. | |
| 2013/0000946 A1* | 1/2013 | Nachbauer | G01M 3/26 174/110 SR |
| 2013/0183874 A1 | 7/2013 | Cawood et al. | |
| 2014/0127931 A1 | 5/2014 | Urashima et al. | |
| 2015/0255915 A1* | 9/2015 | Kao | H01R 24/28 439/606 |
| 2015/0255916 A1* | 9/2015 | Kao | H01R 43/24 439/606 |
| 2015/0357769 A1* | 12/2015 | Kao | H01R 24/28 439/606 |

OTHER PUBLICATIONS

Office Action dated Sep. 2, 2016 from related U.S. Appl. No. 14/198,195, 11 pages.
Office Action dated Apr. 23, 2015 from related U.S. Appl. No. 14/197,744, 11 pages.
Notice of Allowance dated Aug. 4, 2015 from related U.S. Appl. No. 14/197,744, 6 pages.
Office Action dated Jun. 2, 2015 from related U.S. Appl. No. 14/198,185, 17 pages.
Final Office Action dated Mar. 11, 2016 from related U.S. Appl. No. 14/198,185, 23 pages.

* cited by examiner

METHOD OF MANUFACTURE INSULATING ELECTRICAL PLUGS

BACKGROUND OF THE INVENTION

1. Field of the Invention

The present invention relates in general to electrical plugs. More particularly, the invention is directed to electrical plugs having electrically-insulating internal cavities, double insulated overmolded electrical plugs, and the method of manufacturing the double insulated overmolded electrical plugs.

2. Description of the Related Art

Heavy-duty industrial and commercial applications require electrical plugs which will not electrically short during operation. Many conventional plugs may provide an inadequate level of electrical insulation for these demanding applications.

Accordingly, a need exists to improve the electrical isolation of electrical plugs as well as a need for a method to manufacture electrical plugs with improved electrical isolation.

SUMMARY OF THE INVENTION

In the first aspect, an electrical plug is disclosed. The electrical plug comprises a wire assembly comprising an electrical cord having at least two wires and at least two electrical connectors, each connector having an electrical prong, a mounting tab, and a wire connector, the electrical connectors connected to a corresponding wire forming at least two electric power lines. The electrical plug further comprises a one-piece body comprising a base having one or more latching mechanisms and at least two cavities, each of the cavities having a through-hole for receiving a corresponding electrical prong, a first cover hingably coupled to the base on a first side of the base, and a second cover hingably coupled to the base on a second side of the base, the second side of the base opposite that of the first side of the base. The first and second covers are movable from open positions exposing the cavities in the base to closed positions where the first and second covers each couple to the latching mechanisms of the base, the first and second covers partially surrounding the cavities.

In a first preferred embodiment, the portions of each power line positioned within the body of the electrical plugs are separated by one or more insulating walls from that of other power lines. The portions of each power line positioned within the body of the electrical plugs are preferably electrically insulated from that of other power lines. The first and second covers each preferably further comprises a protrusion on an outer surface of the first and second covers. The base further preferably comprises a plurality of eyelet shoulders, each shoulder surrounding the through-holes and extending away from the base in a direction parallel with the electrical prongs. The electrical plug preferably further comprises a ground pin electrical connector, and a ground pin assembly securing the ground pin electrical connector, wherein the ground pin assembly is configured for engaging with the base. The ground pin assembly preferably further comprises a T shaped rib, the base further comprises an outer track shaped to receive the T shaped rib and the ground pin assembly engaging with the base comprises the track on the base receiving the ground pin assembly. Each cavity of the base preferably further comprises a mounting surface for engaging the mounting tab of each of the electrical connectors. The mounting surfaces and the first and second covers are preferably positioned in the closed position essentially secures the electrical connector within the one-piece body. The first and second covers each preferably further comprises a tab for engaging with the latching mechanism of the base.

In a second aspect, an electrical plug comprises a wire assembly comprising an electrical cord having at least two wires and a first and a second electrical connectors, each electrical connector having a prong section, a mounting tab section, and a wire connector section, the electrical connectors connected to a corresponding wire forming at least two electric power lines. The electric plug further comprises a one-piece body comprising a base portion having at least two cavities, each of the cavities having a through-hole and a mounting surface, a first through-hole receiving the prong section of the first electrical connector, a second through-hole receiving the prong section of the second electrical connector, the base portion further comprising a central latching mechanism, a first cover hingably coupled to the base on a first side of the base, the first cover rotatable about a first axis generally parallel with the length of the wires positioned near the body, and a second cover hingably coupled to the base on a second side of the base opposite the first side, the second cover rotatable about a second axis generally parallel with the length of the wires positioned near the body. The first and second covers are movable from open positions exposing the cavities in the base to closed positions where the first and second covers each couple to the latching mechanism of the base, and the mounting tab section, the wire connector section, and the portion of the wire connected to the wire connector section of the first cavity is electrically isolated from that of the second cavity.

In a second preferred embodiment, portions of each power line positioned within the body of the electrical plugs are separated by one or more insulating walls from that of other power lines. The first and second covers each preferably further comprises a protrusion on an outer surface of the first and second covers. The base preferably further comprises a plurality of eyelet shoulders, each shoulder surrounding the through-holes and extending away from the base in a direction parallel with the electrical prongs. The electrical plug preferably further comprises a ground pin electrical connector, and a ground pin assembly securing the ground pin electrical connector, wherein the ground pin assembly is configured for engaging with the base. The ground pin assembly preferably further comprises a T shaped rib, the base further comprises an outer track shaped to receive the T shaped rib, and the ground pin assembly engaging with the base comprises the track on the base receiving the ground pin assembly. Each cavity of the base preferably further comprises a mounting surface for engaging the mounting tab of each of the electrical connectors. The mounting surfaces and the first and second covers positioned in the closed position essentially secures the electrical connector within the one-piece body. The first and second covers each preferably further comprises a tab for engaging with the latching mechanism of the base.

In a third aspect, a method for providing an electrical plug comprises providing electrical connectors having a prong section, a mounting tab section, and a wire connector section, providing an electrical cord comprising at least two electrical wires, providing an insulating housing having a central portion having cavities and through-holes for receiving electrical connectors and two cover portions both adjacent to the central portion, each configured for pivoting about axes. The method further comprises connecting the wires to the corresponding electrical connectors, opening the insulating housing to reveal the central portion, inserting the electrical connectors into the corresponding through-hole, rotating the cover portions to surround the electrical connectors, and securing the cover portions in place.

In the fourth aspect, an overmolded electrical plug comprises an inner body assembly comprising a wire assembly comprising an electrical cord having at least two wires and at least two electrical connectors each electrical connector having an electrical prong, the electrical connectors connected to a corresponding wire forming at least two electric power lines and an inner body securing and essentially surrounding the electrical connectors and a portion of the wire proximal to the electrical connectors, the inner housing having at least two through-holes receiving a corresponding electrical prong, the inner housing having one or more internal partitions separating each of the electrical connectors. The overmolded electrical plug further comprises an overmolded outer housing partially encasing the inner body assembly.

In a fourth preferred embodiment, the inner body further comprises one or more protrusions projecting outward and away from the inner body, and the protrusions are flush with or extend beyond the overmolded outer housing. The protrusions are preferably shaped to indicate an orientation. One of the protrusions is preferably "L" shaped and the other of the protrusions is a reflection of the "L" shape. The inner body preferably further comprises at least two eyelet shoulders surrounding the apertures and the portion of the electrical prong proximal to the inner body and projecting outward and away from the inner body, and the eyelet shoulders are flush with or extend beyond the overmolded outer housing. The inner body assembly preferably further comprises a dielectric gapfill material encapsulating the wire assembly within the inner body assembly of the inner housing. The inner body preferably further comprises feeding vents for receiving molten insulating material and escape vents for releasing air from the inner body. The portions of each electrical line encapsulated within the overmolded electrical plug are preferably electrically isolated from other electrical lines by both the inner body and the overmold material.

In a fifth aspect, an overmolded electrical plug comprises an inner body assembly comprising a wire assembly comprising an electrical cord having at least two wires and at least two electrical connectors, each electrical connector having an electrical prong, the electrical connectors connected to a corresponding wire forming at least two electric power lines, and an inner housing securing and essentially surrounding the electrical connectors and a portion of the wires proximal to the electrical connectors, the inner housing having a front mating end with at least two through-holes oriented in a first direction substantially perpendicular to the length of the portion of the electrical cord proximal to the inner housing, each through-hole receiving a corresponding electrical prong. The overmolded electrical plug further comprises an overmolded outer housing partially encasing the inner body assembly.

In a fifth preferred embodiment, the inner body further comprises one or more protrusions projecting outward and away from the inner body, the protrusions are flush with or extend beyond the overmolded outer housing. One of the protrusions is preferably "L" shaped and the other of the protrusions is preferably a reflection of the "L" shape. The inner body preferably further comprises at least two eyelet shoulders surrounding the apertures and the portion of the electrical prong proximal to the inner body and projecting outward and away from the inner body, and the eyelet shoulders are flush with or extend beyond the overmolded outer housing. The inner body assembly preferably further comprises overmolded material encapsulating the wire assembly within the inner body assembly. The portions of each electrical line encapsulated within the overmolded electrical plug are preferably electrically isolated from other electrical lines by both the inner body and the overmold material.

In a sixth aspect, the overmolded electrical plug comprises an inner body assembly comprising a wire assembly comprising an electrical cord having at least two wires and at least two electrical connectors, each electrical connector having an electrical prong, the electrical connectors connected to a corresponding wire, an inner housing securing and essentially surrounding the electrical connectors and a portion of the wires proximal to the electrical connectors, the inner housing having a front mating end with at least two through-holes oriented in a first direction substantially parallel to the length of the portion of the electrical cord proximal to the inner housing, each through-hole receiving a corresponding electrical pron. The overmolded electrical plug further comprises an overmolded outer housing partially encasing the inner body assembly.

In a sixth preferred embodiment, the inner body further comprises one or more protrusions projecting outward and away from the inner body, and the protrusions are flush with or extend beyond the overmolded outer housing. One of the protrusions is preferably "L" shaped and the other of the protrusions is a reflection of the "L" shape. The inner body preferably further comprises at least two eyelet shoulders surrounding the apertures and the portion of the electrical prong proximal to the inner body and projecting outward and away from the inner body, and the eyelet shoulders are flush with or extend beyond the overmolded outer housing. The inner housing preferably further comprises the overmold material encapsulating the wire assembly within the inner body assembly. The portions of each electrical line encapsulated within the overmolded electrical plug are preferably electrically isolated from other electrical lines by both the inner body and the overmold material.

In the seventh aspect, a method for manufacturing an overmolded electric plug is disclosed. The method comprises producing an injection mold comprising a top mold block and a bottom mold block, the injection mold having a mold cavity shaped to correspond to the desired shape of the overmolded electric plug, the bottom mold block shaped to receive and detachably secure an inner body assembly having protruding electrical prongs, the injection mold having a feeder injection port and multiple air escape paths. The method further comprises placing an inner body assembly with protruding electrical prongs into the bottom mold, injecting a molten insulating material into the injection mold through the feeder injection port, the injected molten material urging the air within the mold to vent via the multiple air escape paths, and removing the overmolded electric plug from the mold.

In a seventh preferred embodiment of the method, the inner body assembly further comprises feeding vents for receiving molten insulating material and escape vents for releasing air from the inner body assembly, and urging the air within the mold to vent further comprises urging the air within the inner body assembly and air surrounding the inner body to vent via the multiple air escape paths. The feeding and the escape vents are preferably positioned on opposite sides of the inner body assembly separated parallel with the wires entering the inner body assembly. A cross sectional area of the feeding vents is preferably greater than that of the escape vents. The inner body assembly preferably further comprises one or more protrusions projecting outward and away from the top of the inner body assembly, and the upper mold block is shaped to receive the protrusions and form a seal surrounding the protrusions to prevent the molten material from depositing on the top surface of the protrusions. One of the protrusions is preferably "L" shaped and the other of the protrusions is a reflection of the "L" shape.

The inner body assembly preferably further comprises at least two eyelet shoulders surrounding the electrical prong proximal to the inner body assembly and projecting outward and away from the inner body assembly, and the lower mold block is shaped to receive the eyelet shoulders and form a seal surrounding the eyelet shoulders to prevent the molten material from depositing on the outer surface of the eyelet shoulders. The method preferably further comprises testing the overmolded electric plug, and marking the overmolded electric plug with laser. Marking the overmolded electric plug preferably further comprises marking the overmolded electric plug with traceability information.

In an eighth aspect, a method for manufacturing an overmolded electric plug is disclosed. The method comprises producing an injection mold comprising a top mold block and a bottom mold block, the injection mold having a mold cavity shaped to correspond to the desired shape of the overmolded electric plug, the bottom mold block shaped to receive and detachably secure an inner body assembly having protruding electrical prongs, and the injection mold having a feeder injection port and multiple air escape paths. The method further comprises providing a wire assembly comprising an electrical cord having at least two wires and at least two electrical connectors each having an electrical prong, providing a one-piece inner body assembly. The inner body assembly comprises a base having one or more latching mechanisms and a plurality of cavities, each of the plurality of cavities having an aperture for receiving a corresponding electrical prong, a first cover hingably coupled to the base on a first side of the base, a eighth cover hingably couple to the base on a second side of the base, the second side of the base opposite that of the first side of the base. The method further comprises positioning the wire assembly into the base, rotating the first and second cover over the base, coupling the first and second cover to the latching mechanism of the base, and placing the inner body assembly with protruding electrical prongs into the bottom mold. The method further comprises injecting a molten insulating material into the injection mold through the feeder injection port, the injected molten material urging the air within the mold to vent via the multiple air escape paths, and removing the overmolded electric plug from the mold.

In an eighth preferred embodiment, the inner body assembly further comprises feeding vents for receiving molten insulating material and escape vents for releasing air from the inner body assembly, and urging the air within the mold to vent further comprises urging the air within the inner body assembly and air surrounding the inner body to vent via the multiple air escape paths. The feeding and the escape vents are preferably positioned on opposite sides of the inner body assembly separated parallel with the wires entering the inner body assembly.

The inner body assembly preferably further comprises one or more protrusions projecting outward and away from the top of the inner body assembly, and the upper mold block is preferably shaped to receive the protrusions and form a seal surrounding the protrusions to prevent the molten material from depositing on the top surface of the protrusions. One of the protrusions is preferably "L" shaped and the other of the protrusions is preferably a reflection of the "L" shape. The inner body assembly preferably further comprises at least two eyelet shoulders surrounding the electrical prong proximal to the inner body assembly and projecting outward and away from the inner body assembly, and the lower mold block is preferably shaped to receive the eyelet shoulders and form a seal surrounding the eyelet shoulders to prevent the molten material from depositing on the outer surface of the eyelet shoulders. The method preferably further comprises testing the overmolded electric plug, and marking the overmolded electric plug with laser with traceability information.

In a ninth aspect, an injection mold system is disclosed. The mold system comprises a top mold block mold cavity shaped to correspond to the desired shape of the upper portion of an overmolded electric plug, a bottom mold block shaped to correspond to the desired shape of the bottom portion of the overmolded electric plug, the bottom mold block shaped to receive and detachably secure an inner body assembly having protruding electrical prongs, a feeder injection port, and multiple air escape paths.

In a ninth preferred embodiment, the upper mold block further comprises recesses configured for receiving protrusions on an inner body assembly and forming seals surrounding the protrusions to prevent the molten material from depositing on the top surface of the protrusions. One of the recesses is preferably "L" shaped and the other of the recess is shaped as a reflection of the "L" shape. The lower mold block preferably has recesses shaped to receive the eyelet shoulders of an inner body assembly and form a seal surrounding the eyelet shoulders to prevent the molten material from depositing on the outer surface of the eyelet shoulders.

These and other features and advantages of the invention will become more apparent with a description of preferred embodiments in reference to the associated drawings.

DETAILED DESCRIPTION OF THE PREFERRED EMBODIMENTS

Figure 1:
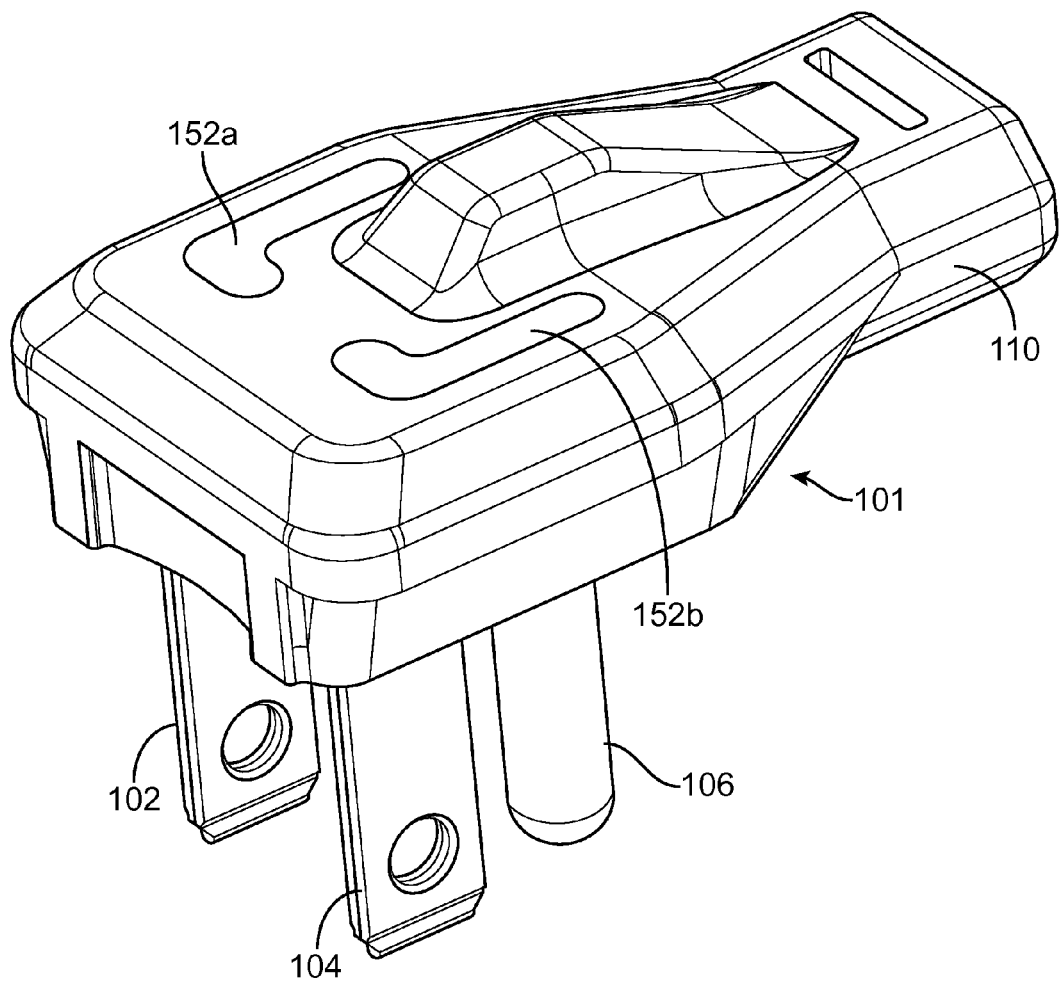
FIG. 1 is a side, perspective view of a flat, double insulated electrical plug in an embodiment.

The following preferred embodiments are directed to electrical plugs having single and double electrical insulation, as well as plugs having orientation indicators. Other preferred embodiments are directed to the methods and systems for manufacturing electrical plugs.

Conventional electrical plugs may be prone to electrical shorting as these plugs may employ a crimping section on an electrical connector for engaging with a stripped wire from an electrical cord. Often, the wires are stranded to enhance the flexibility of the electrical cord. Unless the electrical connectors crimp every strand of wire, strands of wire may extend away from the electrical connectors which may possibly short with other electrical connectors.

One or more embodiments provide an electrical plug having partitions or walls in the body which physically and electrically isolate the electrical connectors from other connectors. Each electrical connector is essentially surrounded by insulating material which prevents strands from making electrical contact with other connectors.

In a preferred embodiment, a one-piece body or "inner body" is employed. The inner body has a central base which accepts the electrical connectors, as well as a first cover on one side of the base and a second cover on the opposite side of the base. The interfaces between the covers and the base are thinner or made more flexible so that the interfaces act as hinges. As such, the covers may be rotated with respect to the base from an open position in which the covers and the base are essentially flat, to a closed position in which the covers collapse and attach to the center of the base. Both the covers and the base have cavities which act to surround the electrical connectors.

In a preferred embodiment, the inner body may have protrusions to indicate positional orientation. These protrusions provide a visible indication that a plug is properly installed in a socket. The protrusions also provide a means to align the body within an injection mold system to form an overmolded body as discussed below. The protrusions may be flush with or extend beyond the overmold body so that the protrusions would be visible. In a preferred embodiment, the color of the inner body is different from that of the overmold to enhance the visibility of the protrusions. One or more embodiments may have eyelet shoulders on the inner body which surround the electrical prongs and may be flush with or extend beyond the overmold material. These eyelet shoulders would also be visible on the overmolded plug.

One or more embodiments provide an overmolded electrical plug in which the electrical contacts are double insulated; that is, the electrical contacts are insulated by both the inner body as well as the overmold material. The inner body has feed vents as well as escape vents, so that during the injection molding process, the overmold material is injected into the inner portions of the inner body as well as on the outside of the inner body. Therefore, electric current arising from an electrical short would have to pass through both the material of the inner body as well as the material of the overmold.

One or more embodiments provide a means to manufacture the overmolded electrical plug. A mold may comprise top and bottom mold blocks. An inner body having electrical prongs coupled to an electric cord is placed in the bottom mold block. The bottom mold block may be shaped similar to that of the corresponding socket so that the inner body is held securely in place. In a preferred embodiment, the inner body has feed vents as well as escape vents. The top mold block is placed above the bottom mold block, and molten material is injected into mold. The molten material flows over the outside of the inner body, and also flows into the interior of the inner body to provide two layers of electrical insulation.

In one or more embodiments, the inner body has extensions to ensure positioning of the inner body by wedging all major faces by the injection tool to prevent melt flow pressure displacement. This prevents uncontrolled shift of the inner body during injection and allows for a very thin, but controlled insulation thickness of materials. The injection gate of the plug is near or in the same direction as the opening of the inner body to allow for axial flow into the inner body. Conventional plugs having an inner body typically only wedge one face of the plug or uses pin positioners on the inject tool to hold the inner body in place. However, this does not provide visual indication of the inner body placement.

As used herein and as is commonly known in the art, electric plugs are connectors which engage with electrical sockets to transmit electrical current and power. While embodiments discussed herein refer to plugs generally conforming to United States and North American 120 volt standards, plugs conforming to other standards, other voltages, direct current, and multiple phase applications are contemplated in one or more embodiments. Moreover, references made to an inner body herein refer in general to an electric plug which may or may not be overmolded with an outer body. As such, the term "inner body" should not be viewed as being limiting in nature and should be understood as an electric plug. Moreover, the general discussion of flat plugs and straight plugs, and the manufacture thereof generally apply to both configurations.

FIG. 1 is a side, perspective view of a flat, double insulated electrical plug 101 in an embodiment. The electrical plug 101 has electrical prongs 102 and 104 for transmitting electric current, and a ground prong 106 to further protect against electrical shorting. Following North American standards, the electrical prong 102 may be the hot or live terminal and the electric prong 104 may be the neutral terminal. Electrical plug 101 has an overmolded outer body 110 which surrounds an inner body 140 as discussed below. The overmold material may be Polyvinyl Chloride ("PVC"), thermoplastics, soft plastics, polymers, or other materials. The inner body 140 has protrusions 152a and 152b for indicating the orientation of the plug 101. In one or more embodiments, protrusion 152a is generally "L" shaped, and protrusion 152b is a reflection of the "L" shape. However, other shapes of protrusions are contemplated in one or more embodiments. For flat plug applications, the protrusions 152a and 152b are perpendicular to the electrical prongs 102, 104, and 106. The colors of the inner body 140 and outer body 110 may be different to make the protrusions 152a and 152b more distinctive.

Figure 2:
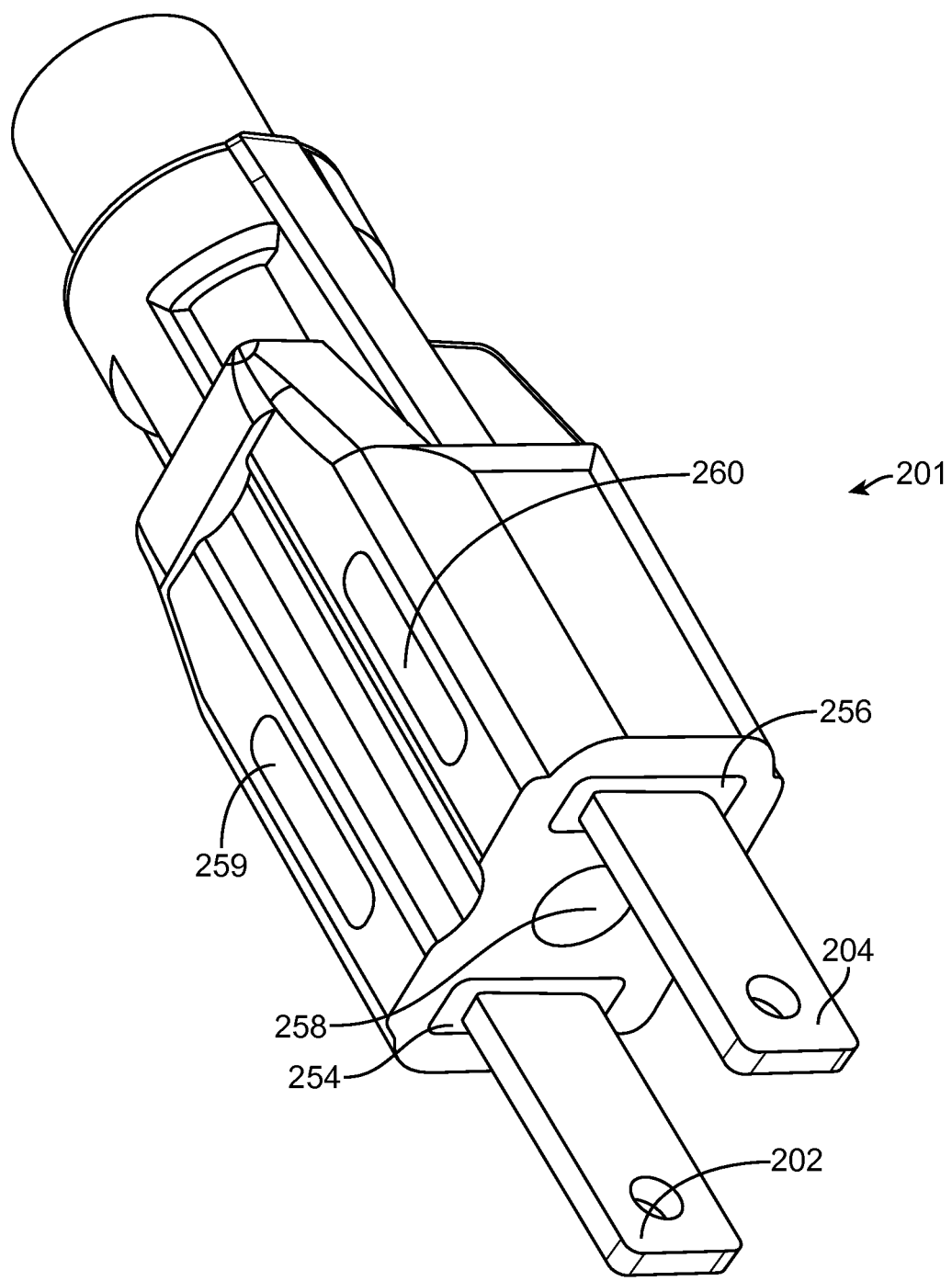
FIG. 2 is a side, perspective view of a straight, double insulated electrical plug in an embodiment.

FIG. 2 is a side, perspective view of a straight, double insulated electrical plug 201 in an embodiment. The electrical plug 201 also has an inner body 240 as discussed below and illustrated in FIGS. 13 and 14. The inner body 240 has eyelet shoulders 254 and 256 as well as protrusion 258, 259, 260 which extend away from the inner body and are visible. Protrusions 261 and 262 (illustrated in FIG. 13) also extend away from the underside of the inner body.

Figure 3:
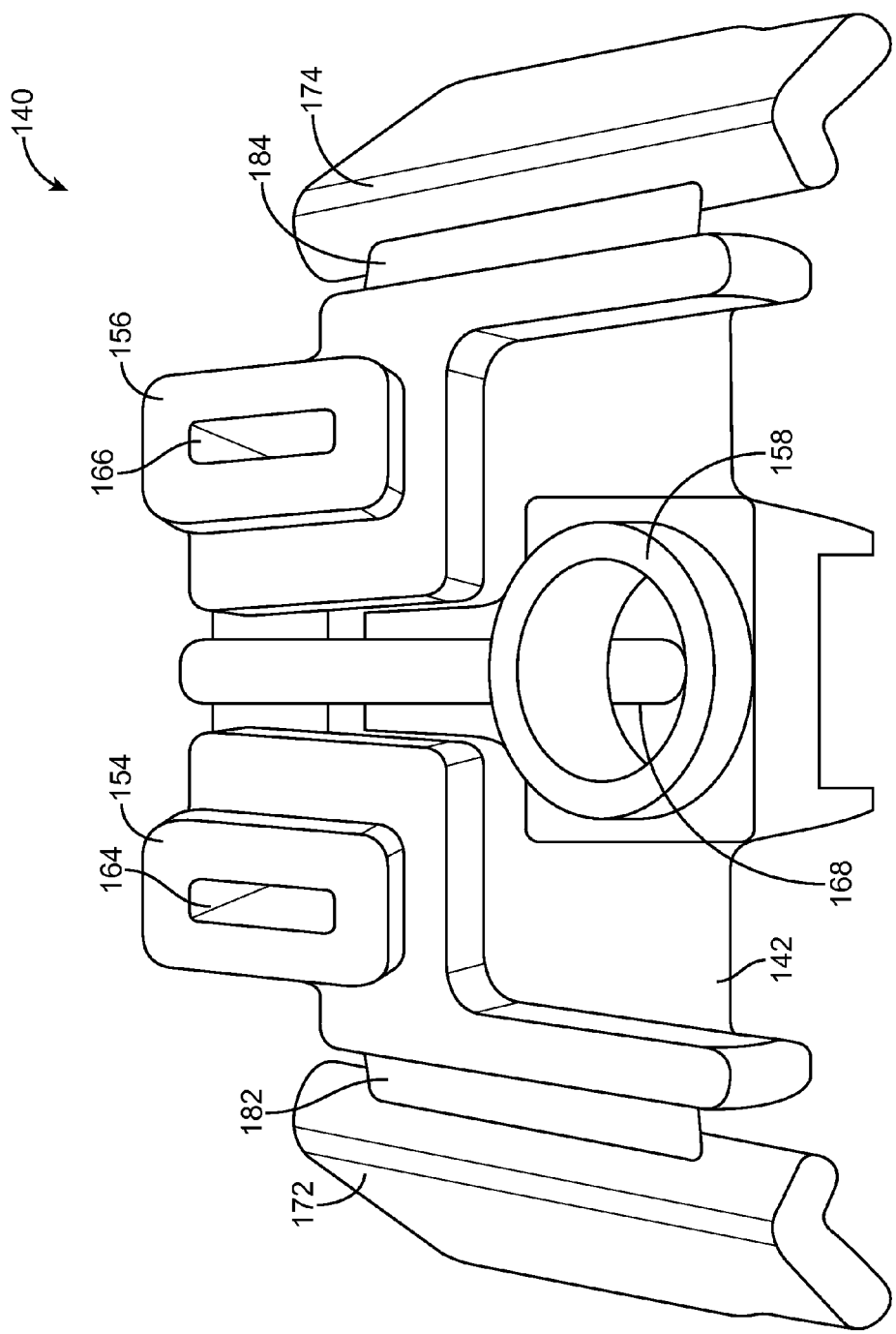
FIG. 3 is a bottom view of an inner body employed in the flat electrical plug.

FIG. 3 is a bottom view of an inner body 140 employed in the flat electrical plug 101. The inner body 140 has a base 142 with a first cover 172 and a second cover 174. The first cover 172 couples to the base 142 via flexible member 182, and second cover couples to the base 142 via flexible member 184. As such, the flexible members 182 and 184 hingably couple the first and second covers 172 and 174 to the base 142 because the flexile members 182 and 184 act as hinges which allow the first cover 172 and the second cover 174 to rotate relative to base 142. In one or more embodiments, the flexible members 182 and 84 may be thinner or more made more compliant than that of the material comprising the base 142 and the covers 172 and 174. The base 142 has through-holes 164, 166, and 168 for receiving electric prongs 102, 104, and 106. The base 142 also has eyelet shoulders 154, 156, and 158 surrounding the through-holes 164, 166, and 168 which extend away from the base 142 in a direction parallel with the electrical prongs. The inner body 140 may also accept attachments for optional fittings like a ground pin holder, a plug face extension, cable locking ring attachments, and so forth.

Figure 4:
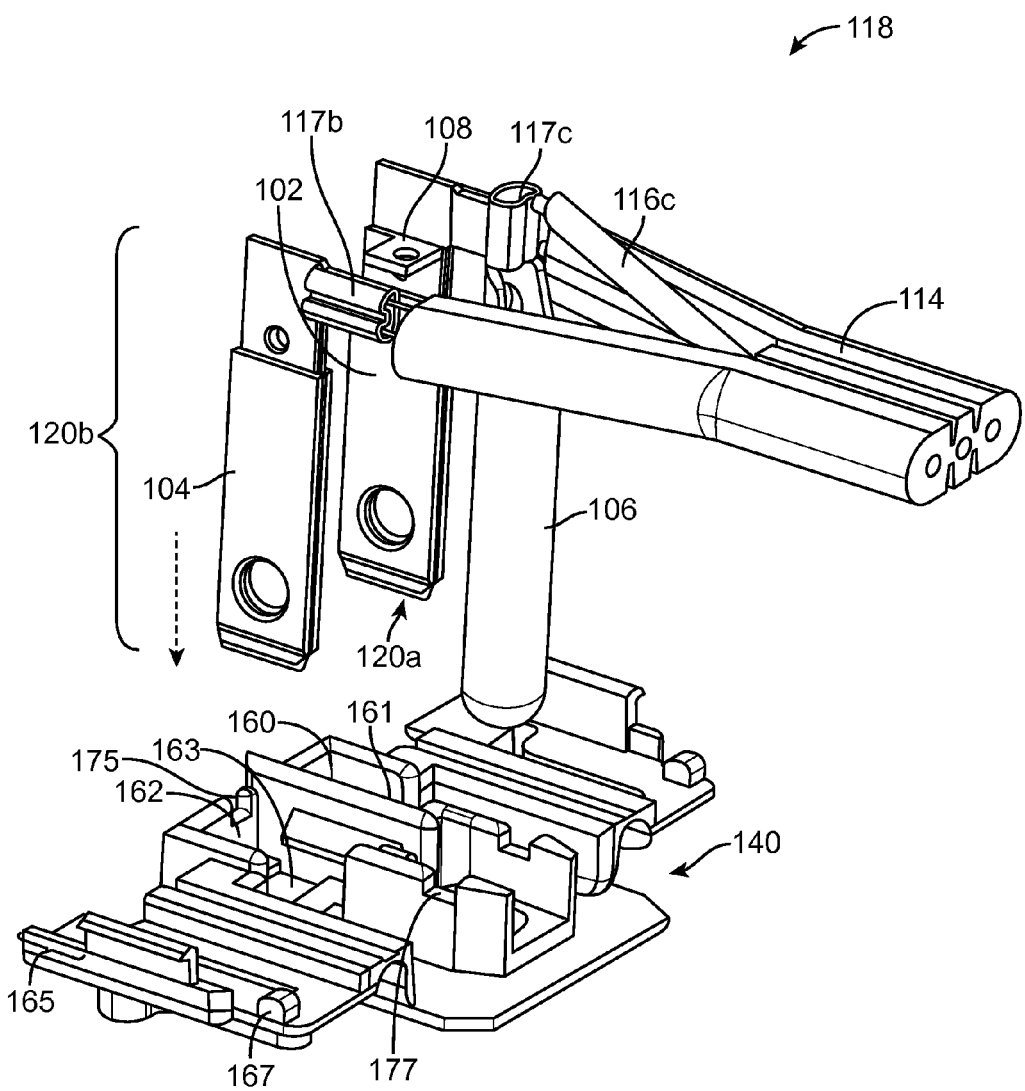
FIG. 4 is an exploded, perspective view of the inner body receiving a wire assembly.
Figure 5:
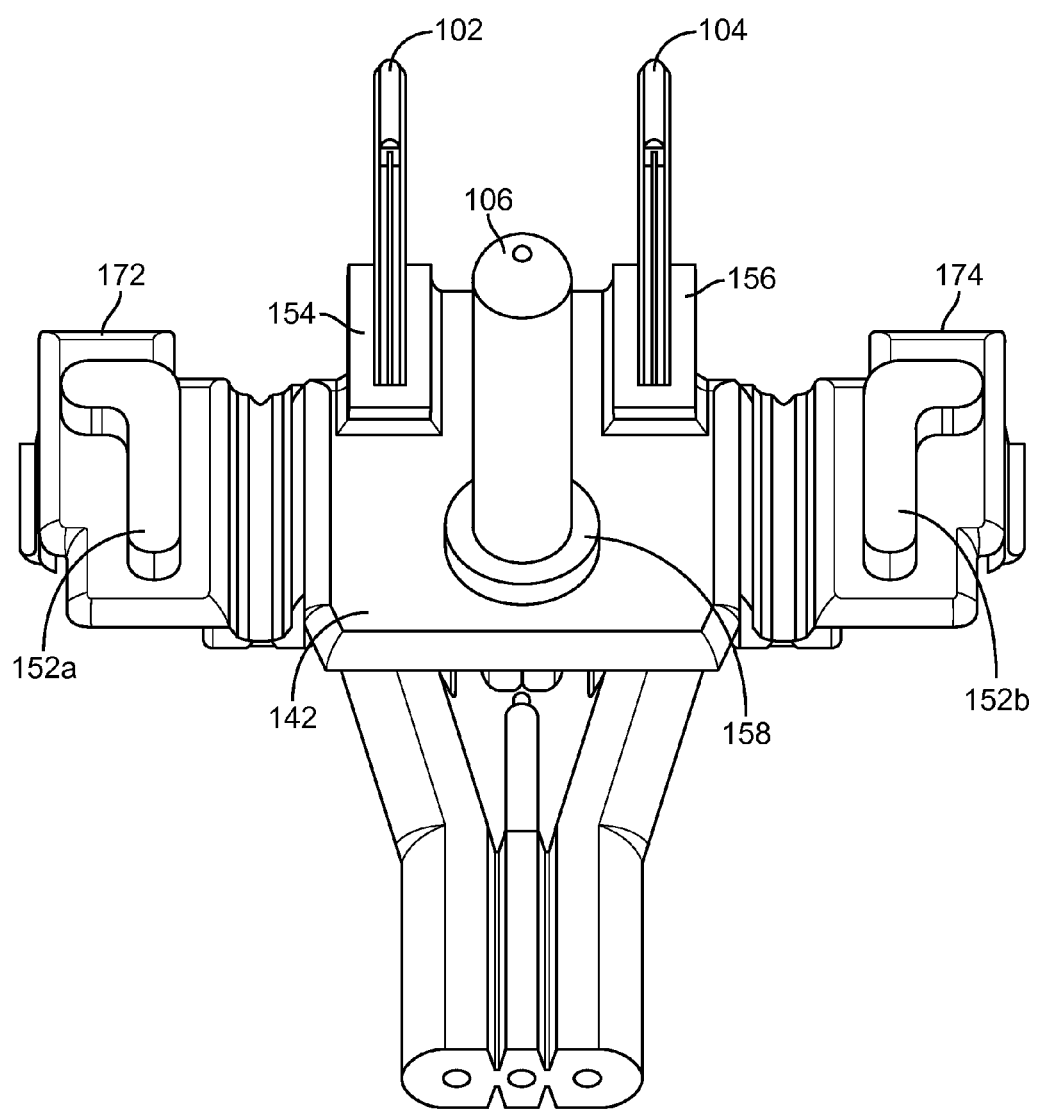
FIG. 5 is a bottom, perspective view of the wire assembly mounted in the inner body.

FIGS. 4 and 5 depict the inner body 140 receiving an electrical wire assembly 118 forming an inner body assembly. The wire assembly 118 includes an electrical cord 114 having at least two wires such as 116c and at least two electrical connectors such as 120a and 120b. Each electrical connector 120a and 120b has an electrical prong 102 and 104, a mounting tab 108, and a wire crimping connectors such as 117a, 117b, and 117c. The electrical connectors 120a-120b are connected to a corresponding wire such as 116c forming at least two electric power lines. FIG. 4 also illustrates that base 142 has two cavities 160 and 162. The cavities 160 and 162 each have a through-hole 164 and 166 for receiving a corresponding electrical prong 102 and 104. Each cavity 160 and 162 has mounting surfaces 161 and 163 for engaging the mounting tab 108 of the electrical connectors 120a and 120b. As shown in FIG. 5, the base 142 further comprises a plurality of eyelet shoulders 154, 156, and 158, where each eyelet shoulder 154, 156, and 158 surrounds the through-holes 164, 166, and 168 (see FIG. 3) and extends away from the base in a direction parallel with the electrical prongs 102, 104, and 106.

FIG. 4 also shows inner body 140 having positioners or ridges 165 and 167 on the cover as well as notches 175 and 177 on the base 142. When the cover closes to the base 142, the ridges 165 and 167 mechanically engage with the notches 175 and 177. These features ensure support of cover when locked in place. These features further provide support of the covers to stay flush against molding tools and to prevent the cover from sinking or flexing under pressure. The features also ensures secure cover placement when tooling is closed onto the inner body 140.

Figure 6:
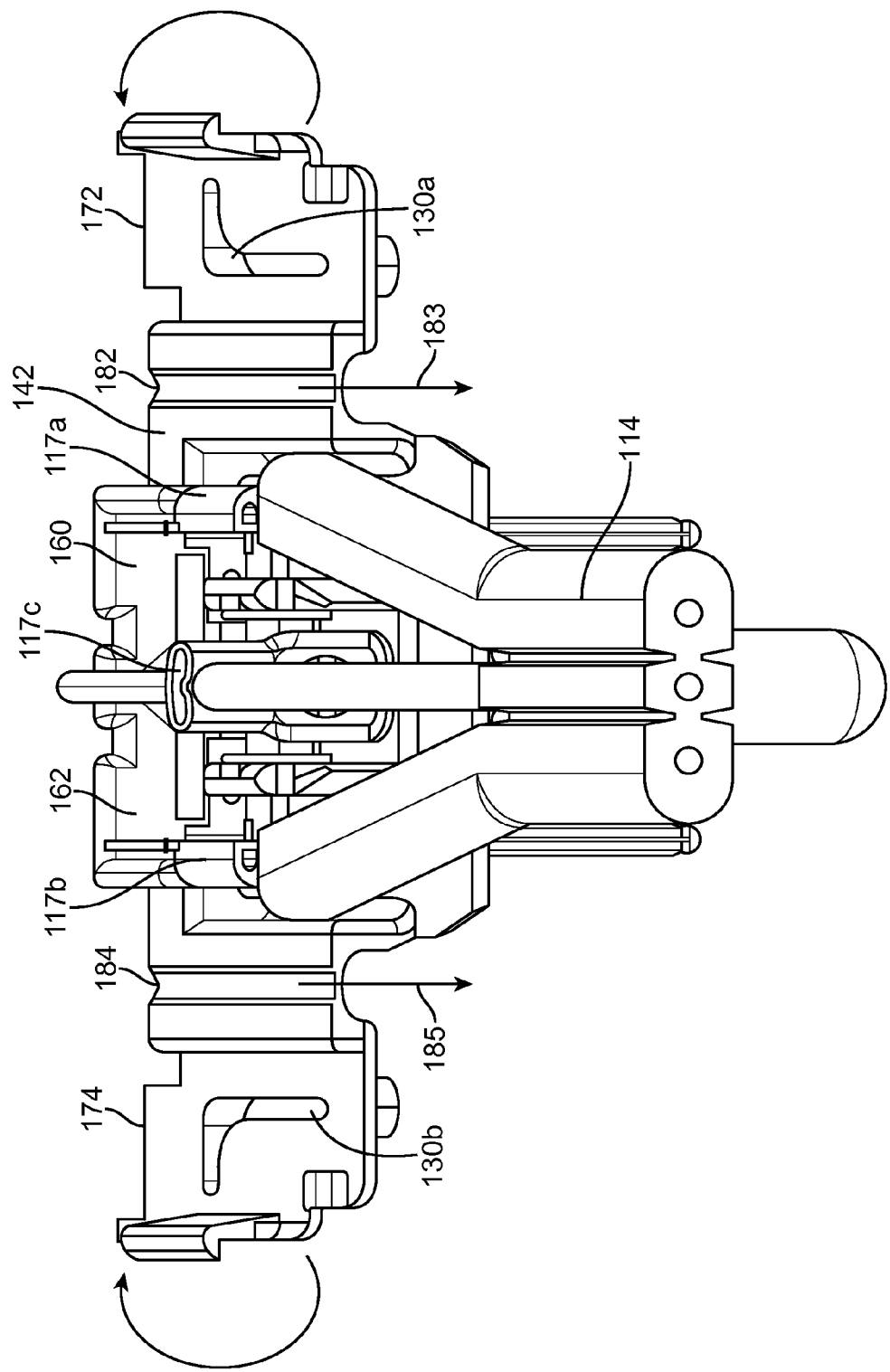
FIG. 6 is a top, perspective view of the inner body depicting the first and second covers rotating upward and over the base of the inner body.

FIG. 6 is a top, perspective view of the inner body 140 depicting the first and second covers 172 and 174 rotating upward and over the base 142 of the inner body 140 in an open position. The first cover 172 is hingably coupled to the base 142 on a first side of the base 142, and the first cover 172 is rotatable about a first axis 183 generally parallel with the length of the wires positioned near the body. The second cover 174 is hingably coupled to the base 142 on a second side of the base 142 opposite the first side, where the second cover 174 is rotatable about a second axis 185 generally parallel with the length of the wires 114 positioned near the body.

FIG. 6 also depicts cavities 130a and 130b on the first cover 172 and second cover 174 respectively. The cavities 130a and 130b are on opposite surfaces of the protrusions 152a and 152b respectively. As a result, when the first cover 172 and the second cover 174 are closed, a gap exists between the covers 172 and 174 and the electrical connectors 120a and 120b. The electrical connectors 120a and 120b are unable to extend into the cavities 130a and 130b because of the relative differences in physical shapes. As discussed below, overmold material is forced into the cavities 130a and 130b during the overmold process to ensure that the electrical connectors 120a and 120b are double insulated. In other words, any shorting electrical current must pass through materials of both the inner body 140 and the overmold material. The ground pin 106 may not be double insulated in an embodiment.

Figure 7:
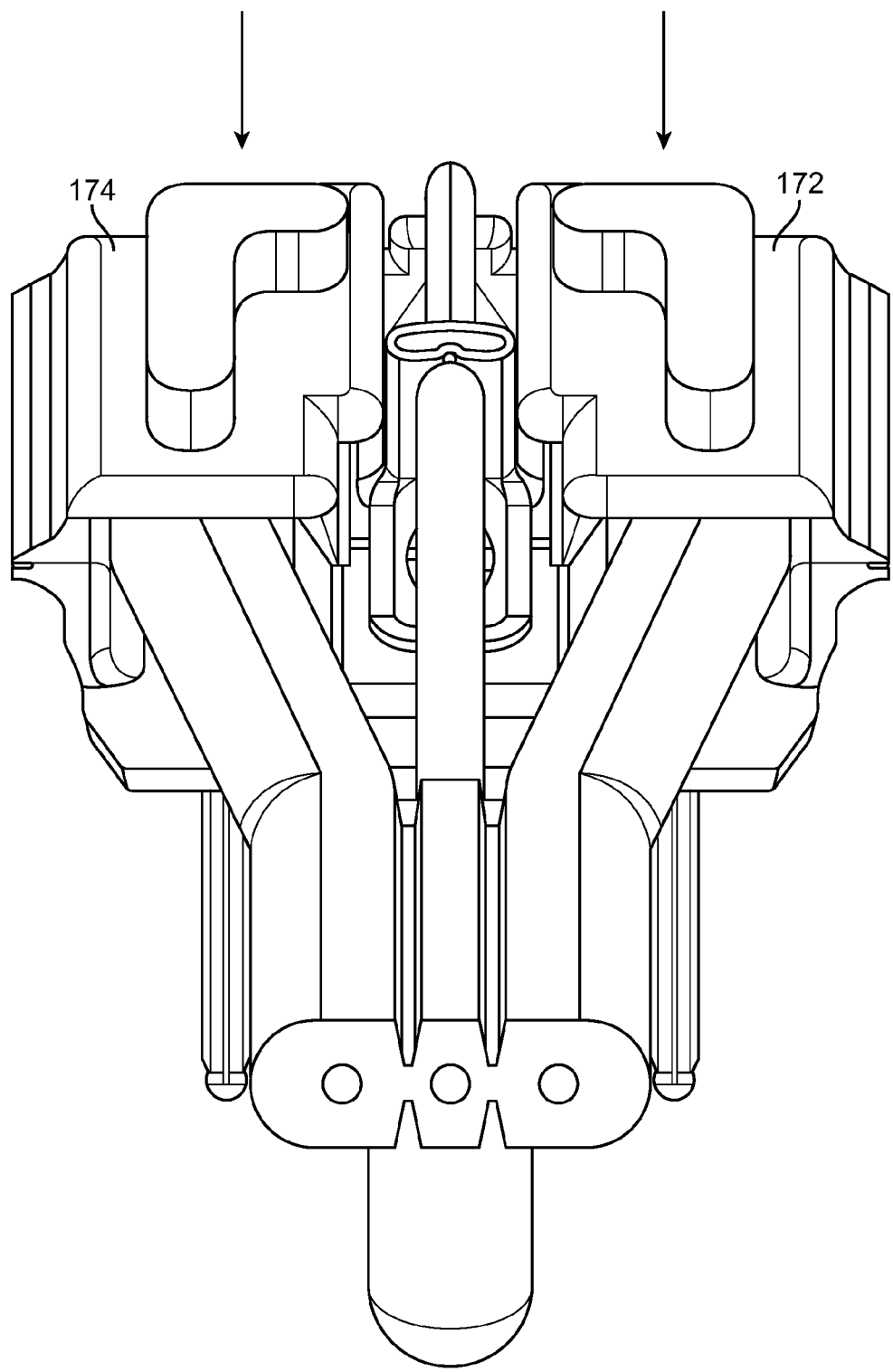
FIG. 7 is a top, perspective view of the covers engaging with the base to form an assembled inner body.

FIG. 7 is a top, perspective view of the first and second covers 172 and 174 engaging with the base 142 in a closed position. The mounting surfaces 161 and 163 and the first and second covers 172 and 174 while in the closed position essentially secures the electrical connectors 102a and 102b within the one-piece inner body 140.

Figure 8:
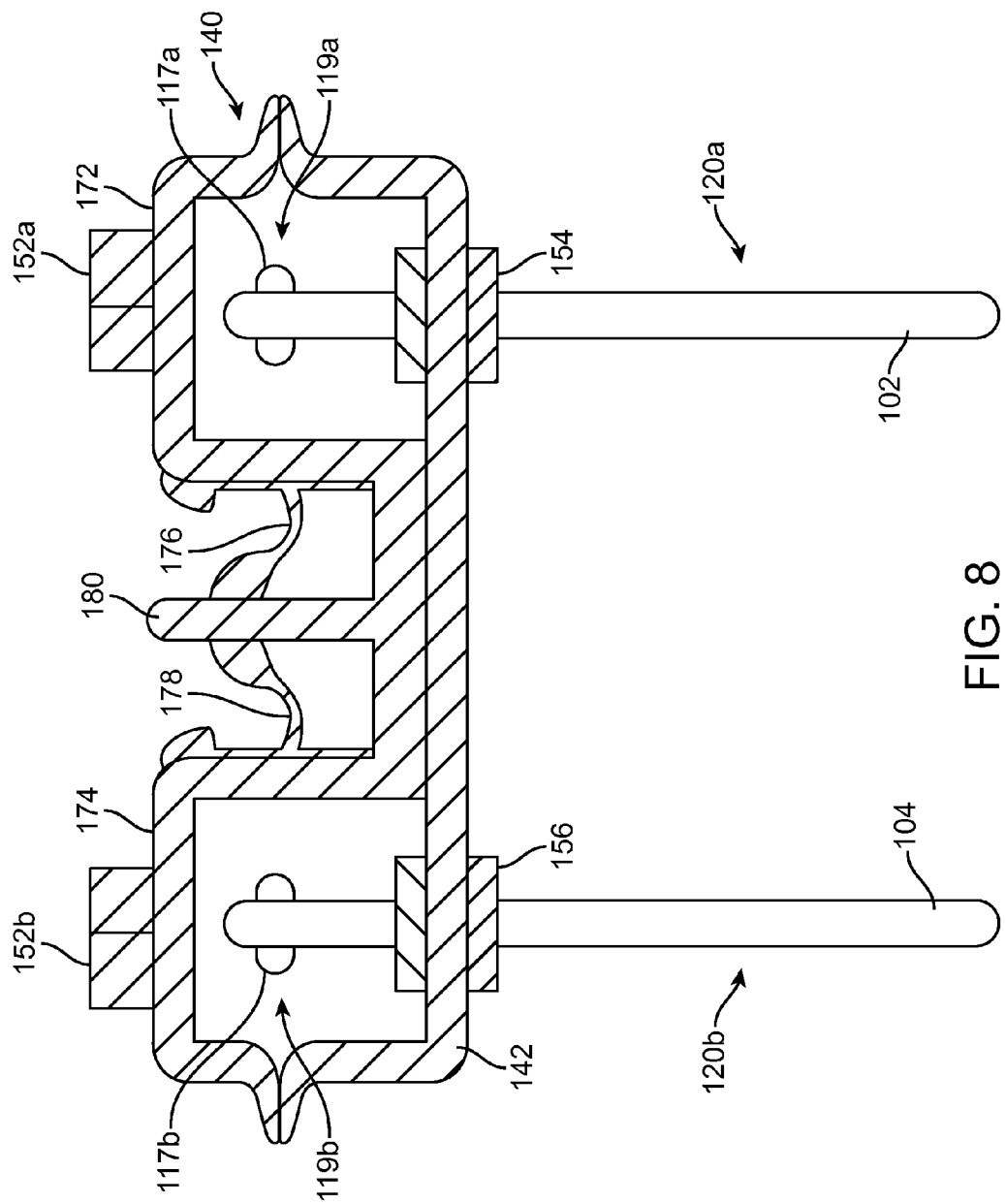
FIG. 8 is a cross-sectional view of the assembled inner body showing that the electrical contacts within the inner body are enclosed in separate cavities.

FIG. 8 is a cross-sectional view of the assembled inner body 140 showing that the portions of electrical connectors 120a and 120b, wire crimp connectors 117a and 117b, connected to connecting wires 116a and 116b as shown in FIG. 4 positioned within interiors 119a and 119b of the inner body 140 are surrounded by the front cover 172, second cover 174, and base 142. Each component within the interior 119a is separated by one or more insulating walls from that of other components in the other interior 119b.

FIG. 8 also depicts a latching mechanism 180 on the base 142. In a preferred embodiment, the first and second covers 172 and 174 have tabs 176 and 178 for engaging with the latching mechanism 180 of the base 142. The latching mechanism 180 is lockable under finger pressure, but are tool accessible if re-opening is needed. This feature prevents accidental opening of the covers 172 and 174 after assembly.

Figure 9:
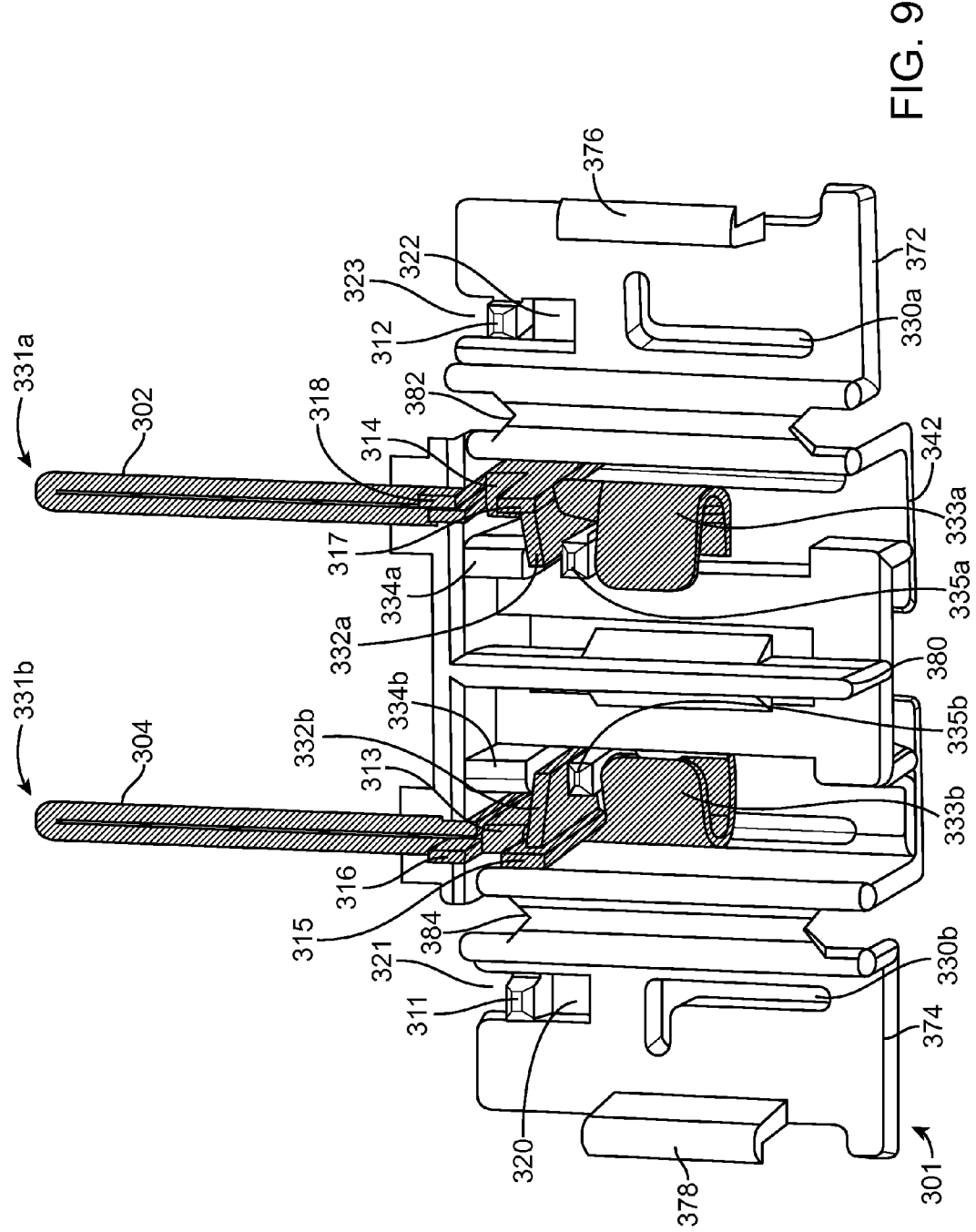
FIG. 9 is a top view of an inner body employed in a straight plug in an embodiment.
Figure 10:
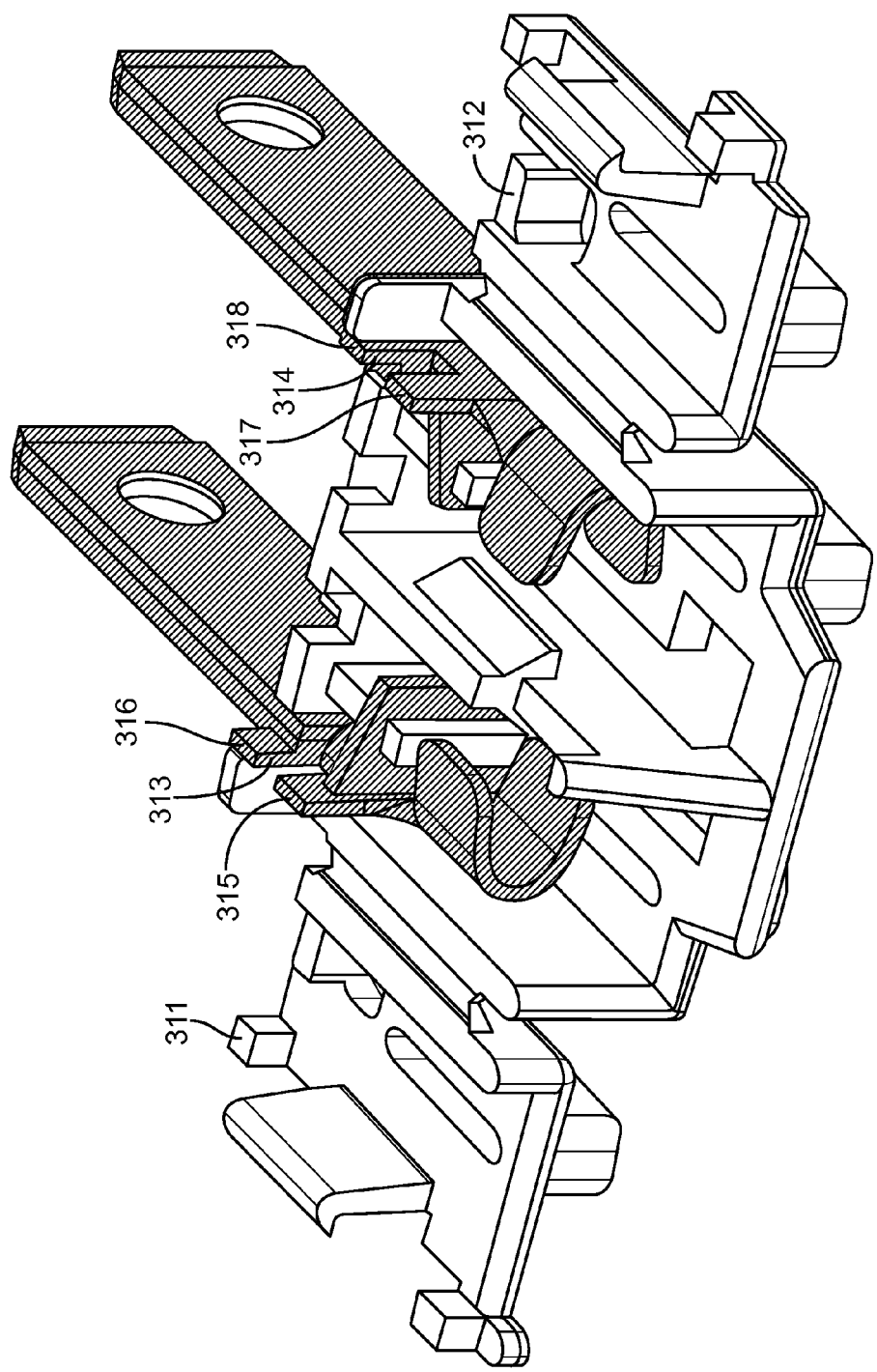
FIG. 10 is a side, perspective view of the inner body employed in a straight plug in an embodiment.
Figure 11:
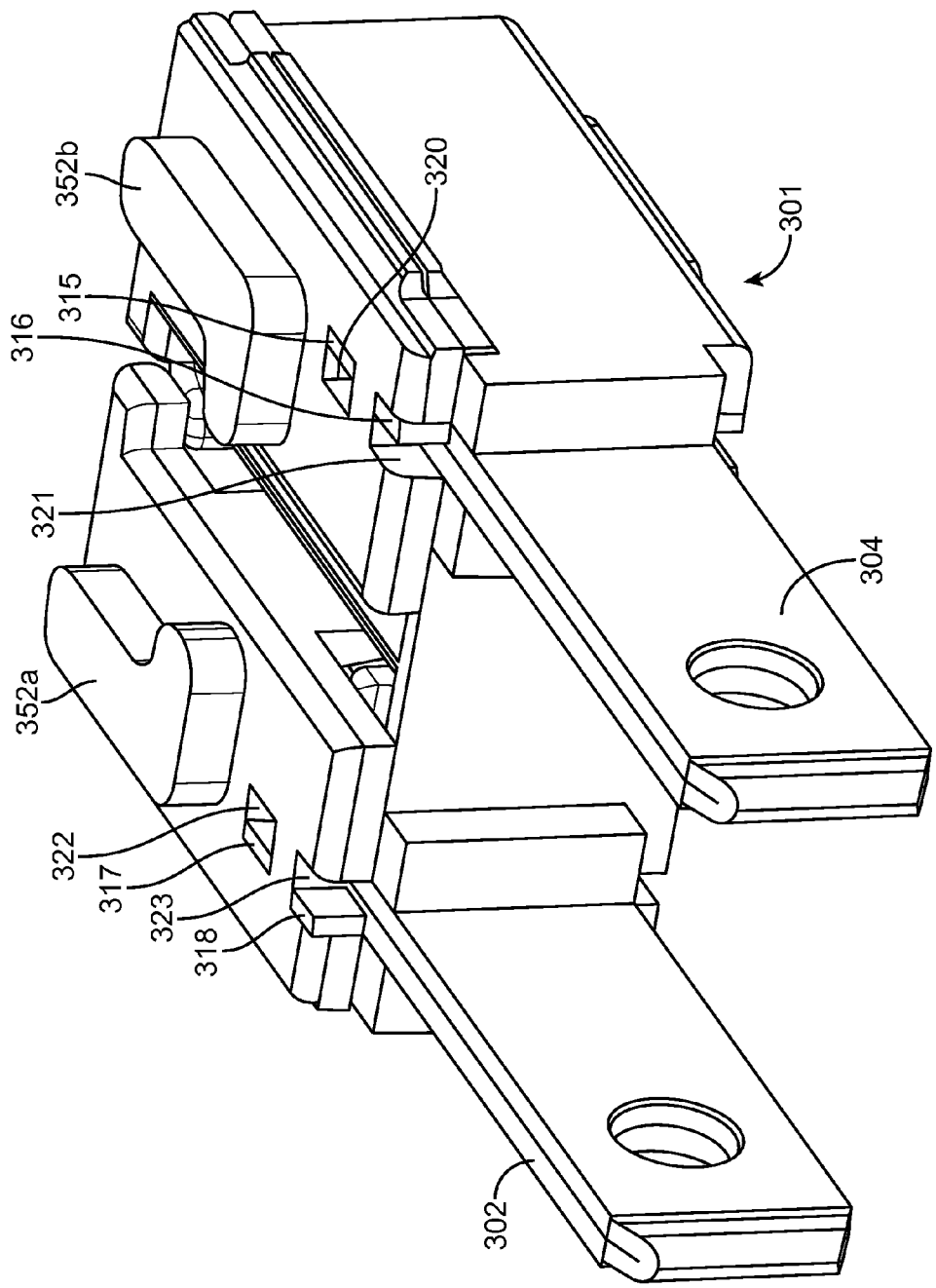
FIG. 11 is a side, perspective view of an assembled inner body employed in a straight plug.

FIGS. 9-11 depict a straight plug or inner body 301 in an embodiment. The inner body 301 has electrical connectors 331a and 331b having electrical prongs 302 and 304 respectively for transmitting electric current, a base 342 which holds the electrical prongs 302 and 304, and a first cover 372 and a second cover 374. The first and second covers 372 and 374 have protrusions 352a and 352b for indicating the orientation of the plug 301 as shown in FIG. 11. In one or more embodiments, protrusion 352a is generally "L" shaped, and protrusion 352b is a reflection of the "L" shape. While an "L" shaped protrusion is described in one or more embodiments, it shall be understood that other shapes such as, but not limited to rectangles, circles, ovals, triangles, arrows, lettering, numbering, or other shapes are contemplated in one or more embodiments.

FIG. 9 also depicts cavities 330a and 330b on the first cover 372 and second cover 374 respectively. The cavities 330a and 330b are on opposite surfaces of the protrusions 352a and 352b respectively. As a result, when the first cover 372 and the second cover 374 are closed, a gap exists between the covers 372 and 374 and the electrical connectors 331a and 331b. The electrical connectors 331a and 331b are unable to extend into the cavities 330a and 330b because of the relative differences in physical shapes. As discussed below, overmold material is forced into the cavities 330a and 330b during the overmold process to ensure that the electrical connectors 331a and 331b are double insulated. In other words, any shorting electrical current must pass through materials of both the inner body 301 and the overmold material.

The first and second covers have tabs 376 and 378 for latching with the latching mechanism 380. FIG. 9 depicts the electrical plug 301 in an open position exposing the components within the plug 301, and FIG. 11 depicts the electrical plug 301 in a closed position.

FIGS. 9 and 10 also illustrate that electrical connector 331b is shaped to have a notched region 313 adjacent to two protruding tabs 315 and 316 which extend away from the electrical prong 304. Likewise, electrical connector 331a is shaped to have a notched region 314 adjacent to two protruding tabs 317 and 318 which extend away from the electrical prong 302. The first cover 374 has a through-hole 320 next to a protruding tab 311, which is in turn adjacent to a notched opening 321. Likewise, the second cover 372 has a through-hole 322 next to a protruding tab 312, which is in turn adjacent to a notched opening 323.

Figure 12:
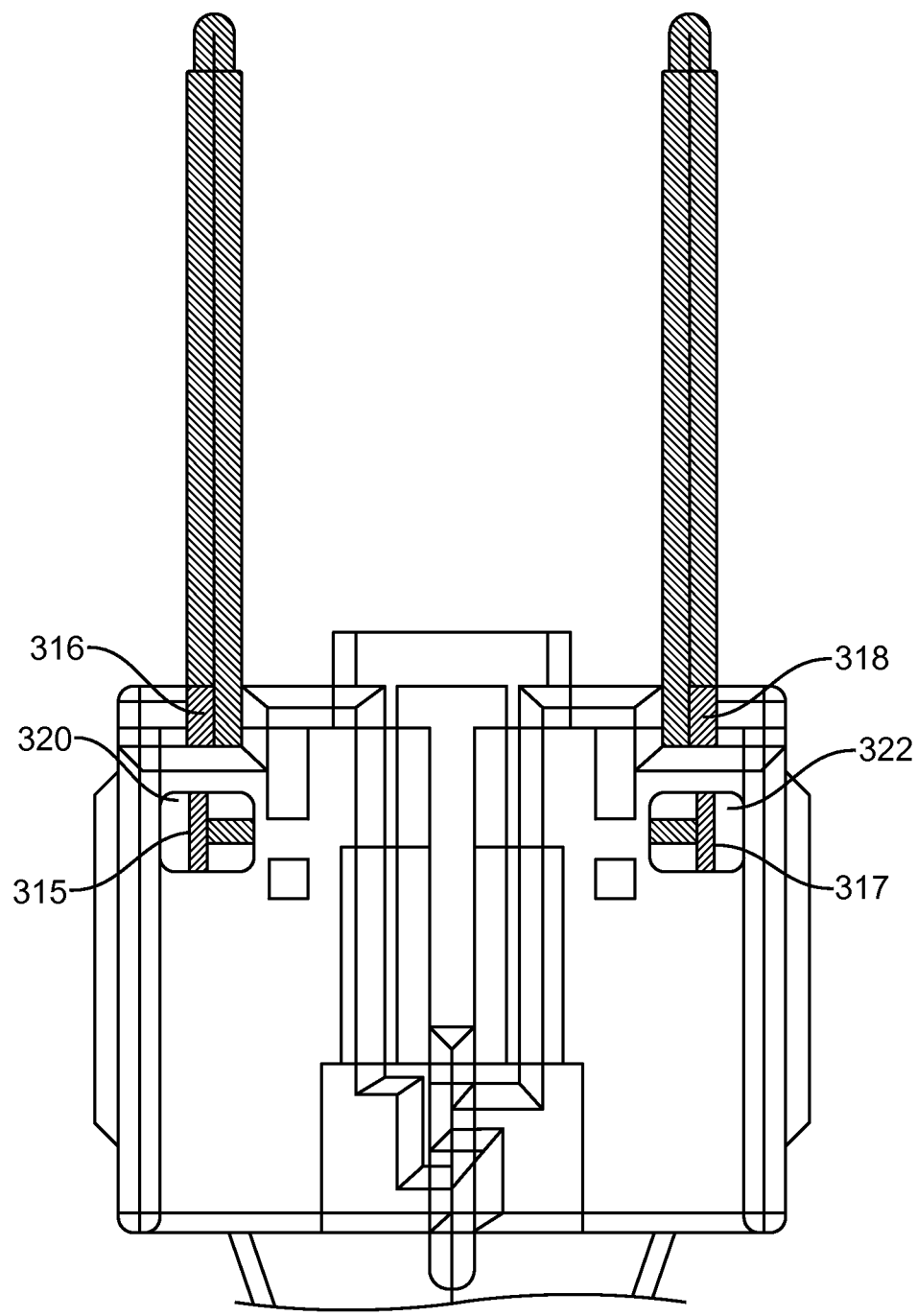
FIG. 12 is a top view of the assembled inner body showing the protrusion of the housing engaging with the notch in the electrical prong.

As depicted in FIGS. 11 and 12, as the covers 372 and 374 are rotated into a closed position, the protruding tabs 311 and 312 engage with the notched regions 313 and 314 to secure the electrical prongs 304 and 302 in place. Likewise, the through-hole 320 and the notched opening 321 receive the protruding tabs 315 and 316 respectively, and the through-hole 322 and the notched opening 323 receive the protruding tabs 317 and 318 respectively. A similar configuration of notches and protruding tabs for the bottom of the electrical prong and through-holes, protruding tabs, and notched openings on the bottom of the inner body are contemplated in one or more embodiments. These features lock the terminals or electrical prongs 304 and 302 in position to prevent pull out or push back of the electrical prongs 304 and 302.

FIG. 9 also depicts that electrical connector 331a further comprises a flap 332a generally perpendicular to the length of the prong 302, as well as a crimp section 333a. Likewise, electrical connector 331b further comprises a flap 332b generally perpendicular to the length of the prong 304, as well as a crimp section 333b. The base 342 has posts 334a and 335a positioned on one side of the inner body 342, and posts 334b and 335b on the opposite side of the inner body 342. As the electrical connector 331a is placed into the base 342, the post 334a and post 335a interleave and engage with the flap 332a and the crimp section 335a. Likewise, as the electrical connector 331b is placed into the base 342, the post 334b and post 335b interleave and engage with the flap 332b and the crimp section 335b. The posts interleaved and engaged with the flaps and crimp sections serve to prevent the electrical connectors 331a and 331b from shifting in a direction parallel with the length of the electrical prongs 302 and 304 when the plug pushed into or removed from an electrical socket. This configuration also serves to maintain a straight and parallel positioning of the electrical prongs 302 and 304 and to lock the electrical prongs 302 and 304 in place ninety degrees with respect to the face of plug.

Figure 13:
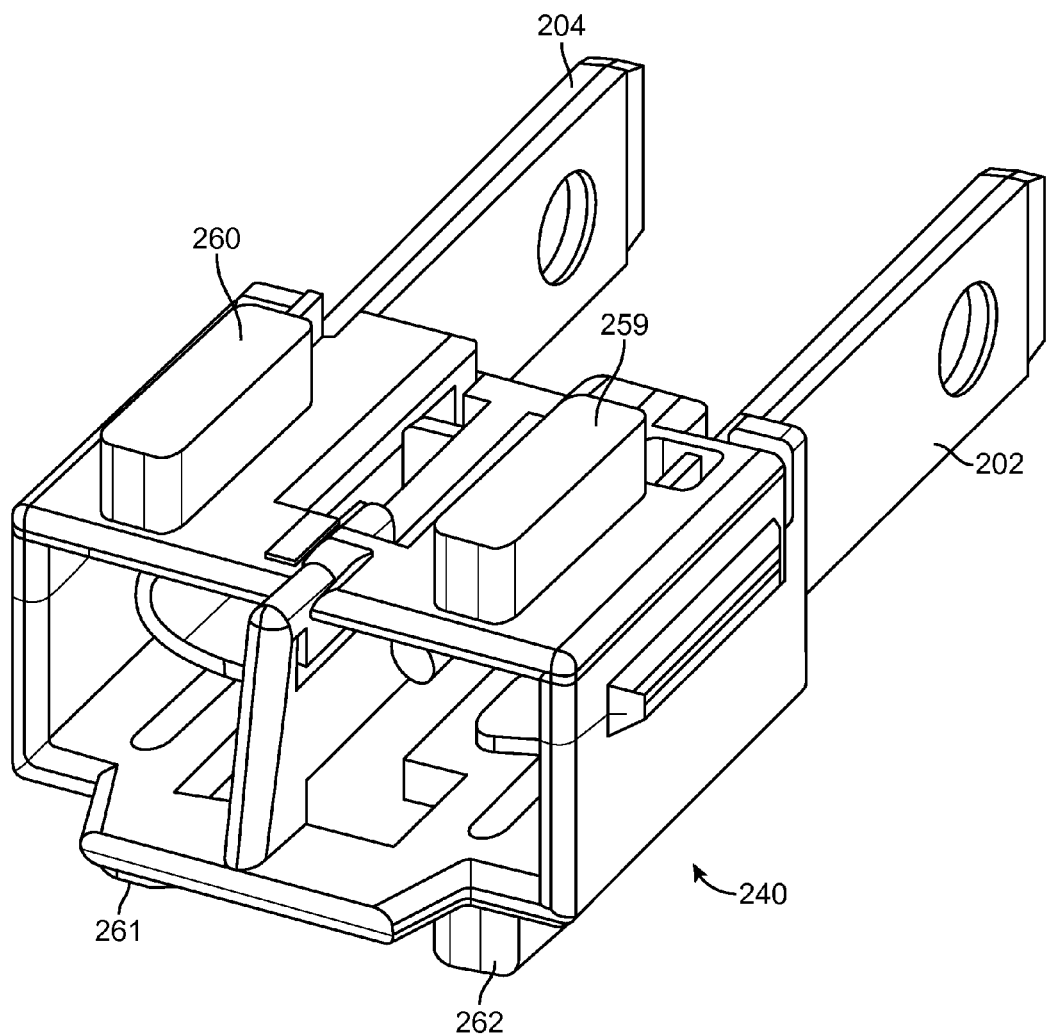
FIG. 13 is a top, perspective view of an assembled inner body.
Figure 14:
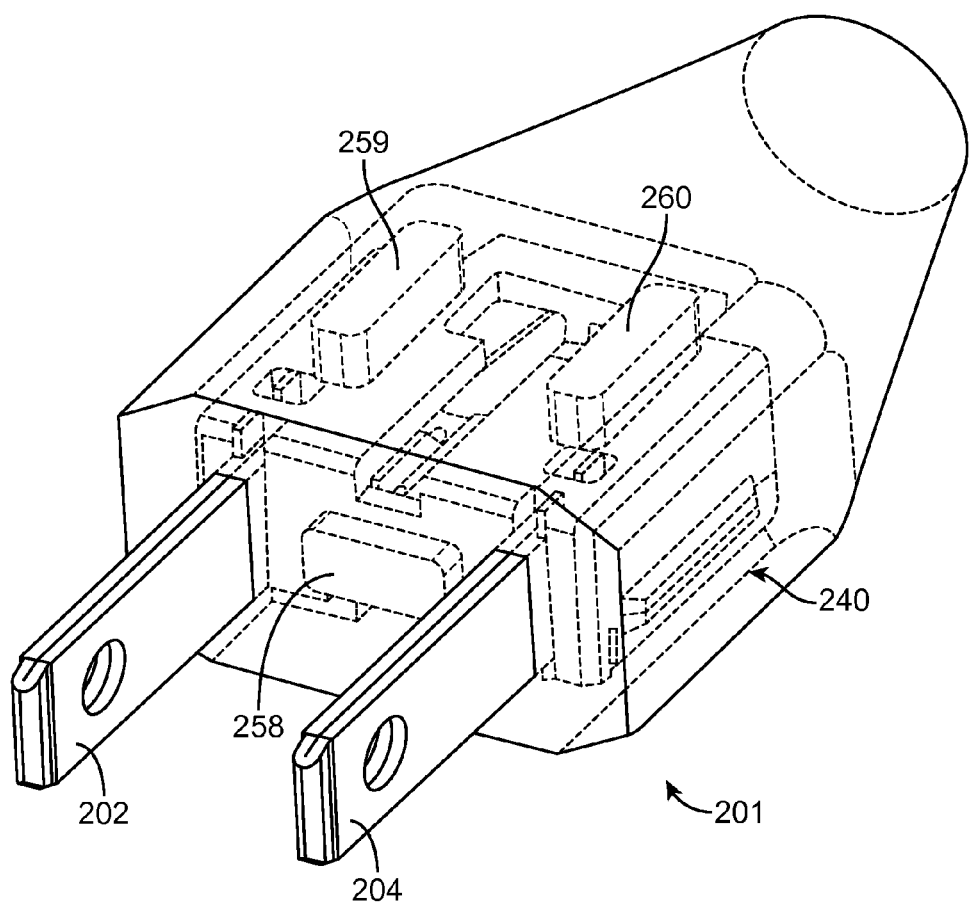
FIG. 14 is a side, perspective view of the overmolded, double insulated straight plug showing internal details.
Figure 15:
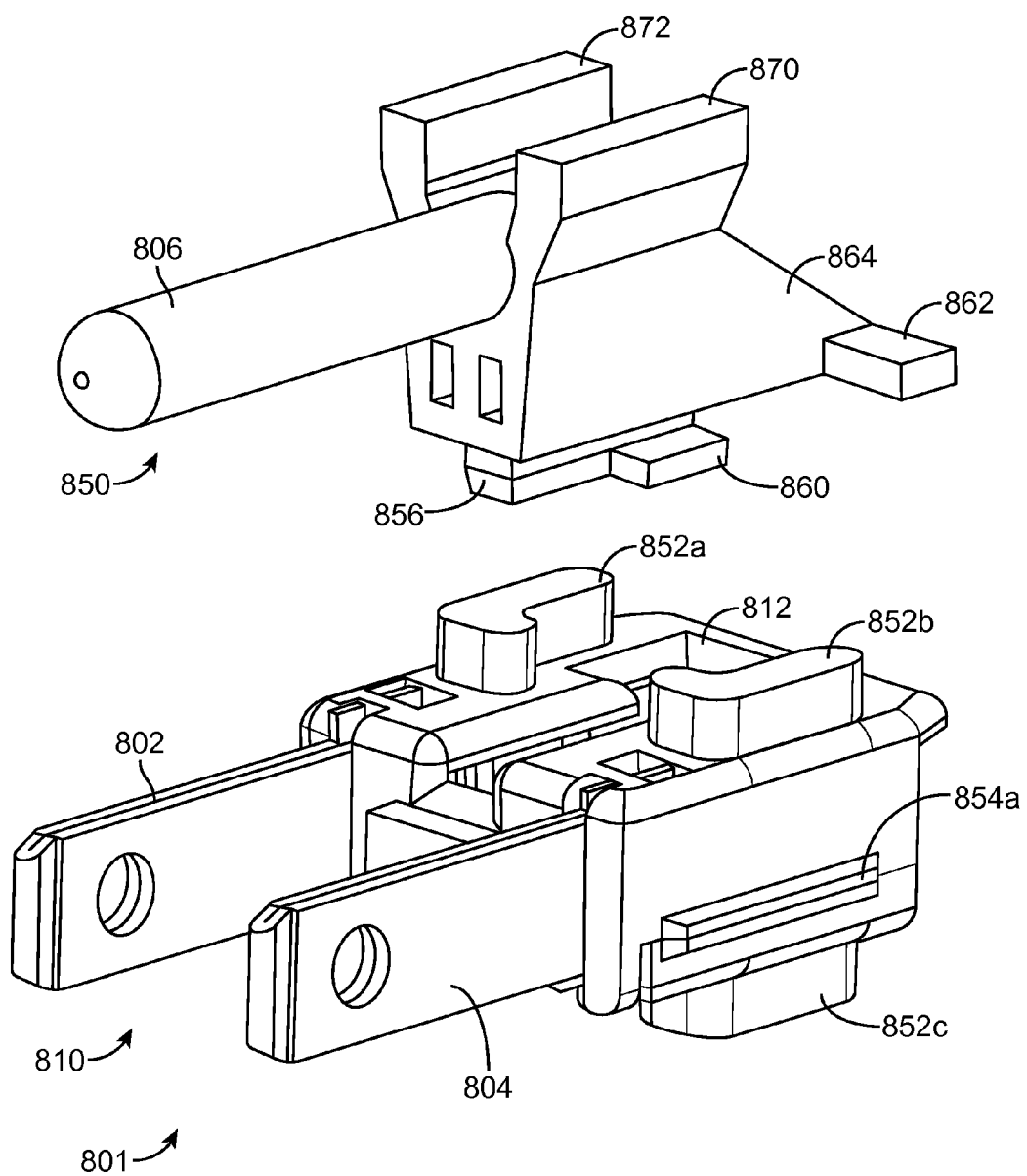
FIG. 15 is a side, perspective view of a two piece inner body comprising a dual prong body and a ground pin body.

FIGS. 2, 13, and 14 depict a straight, double insulated electrical plug 201 in an embodiment. The electrical plug 201 has an inner body 240 holding two electrical prongs 202 and 204. The inner body 240 has protrusions 259 and 260 on the top surface, protrusions 261 and 262 on the bottom surface, and protrusion 258 between the electrical prongs 202 and 204. As shown in FIGS. 2 and 14, the protrusion 258 may comprise several physical shapes including a circle and a rectangle with rounded corners. These protrusions provide visual evidence of an inner body 240, and also serve to secure the inner body 240 during an overmold process discussed further below.

FIGS. 15-18 illustrate an overmolded, double insulated electrical plug 851 having a two-piece inner body 801. The two-piece inner body 801 comprises a dual prong body 810 and a ground pin body 850. The dual prong body 810 has electrical prongs 802 and 804 as well as protrusions 852a and 852b on one side of the dual prong body 810 and protrusions 852c and 852d on the other side of the dual prong body. These protrusions 852a-852d may serve to indicate orientation of the plug in one or more embodiments. The dual prong body 810 may also have ridges 854a and 854b on the sides. The dual prong body 810 has a cavity 812 for mating with the ground pin body 850 as discussed below.

The ground pin body 850 has a housing 864 securing and orienting the ground pin 806. The housing 864 has protruding fingers 870 and 872 extending away from the housing 864, and has a platform 856 having a perpendicular arm 860 on the side opposite the protruding fingers 870 and 872. An arm 862 is also positioned on the housing 864 on the side opposite the protruding fingers 870 and 872.

Figure 16:
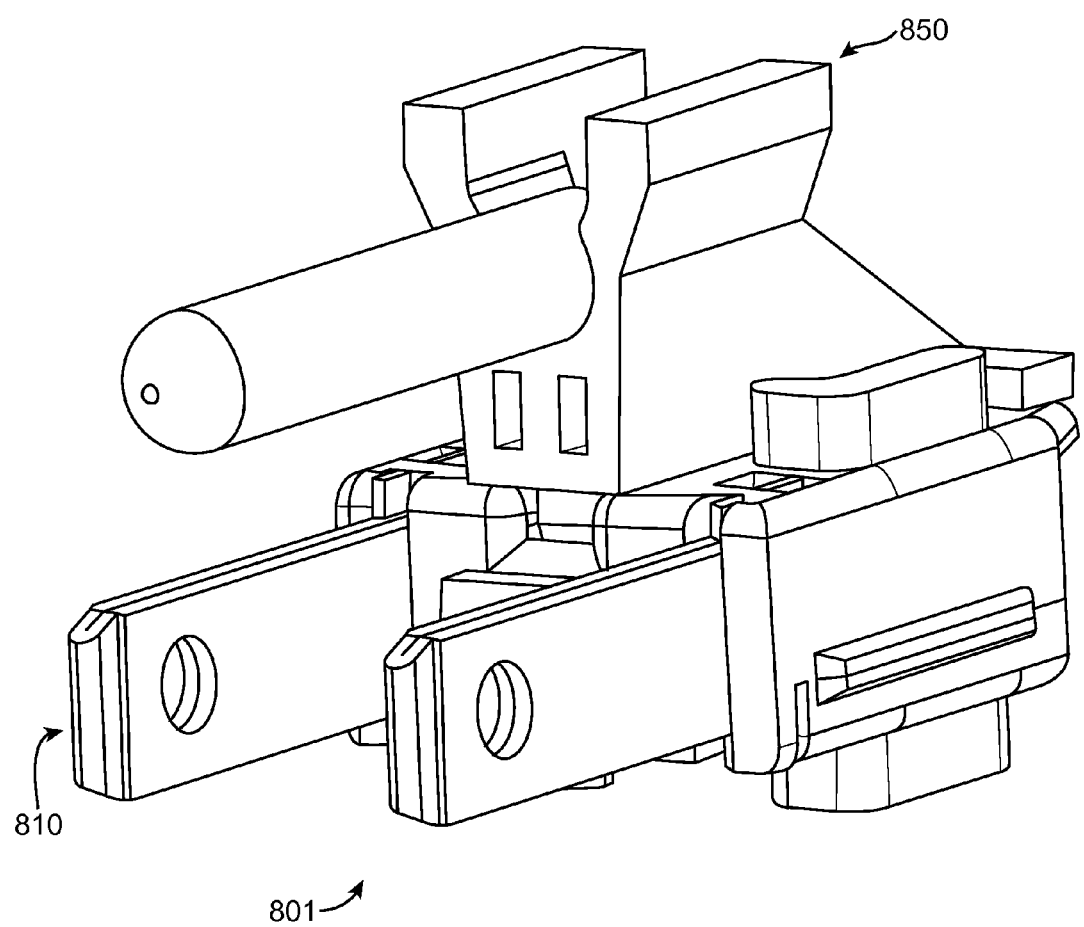
FIG. 16 is an exploded, perspective view of the assembled two piece inner body and ground pin body.
Figure 17:
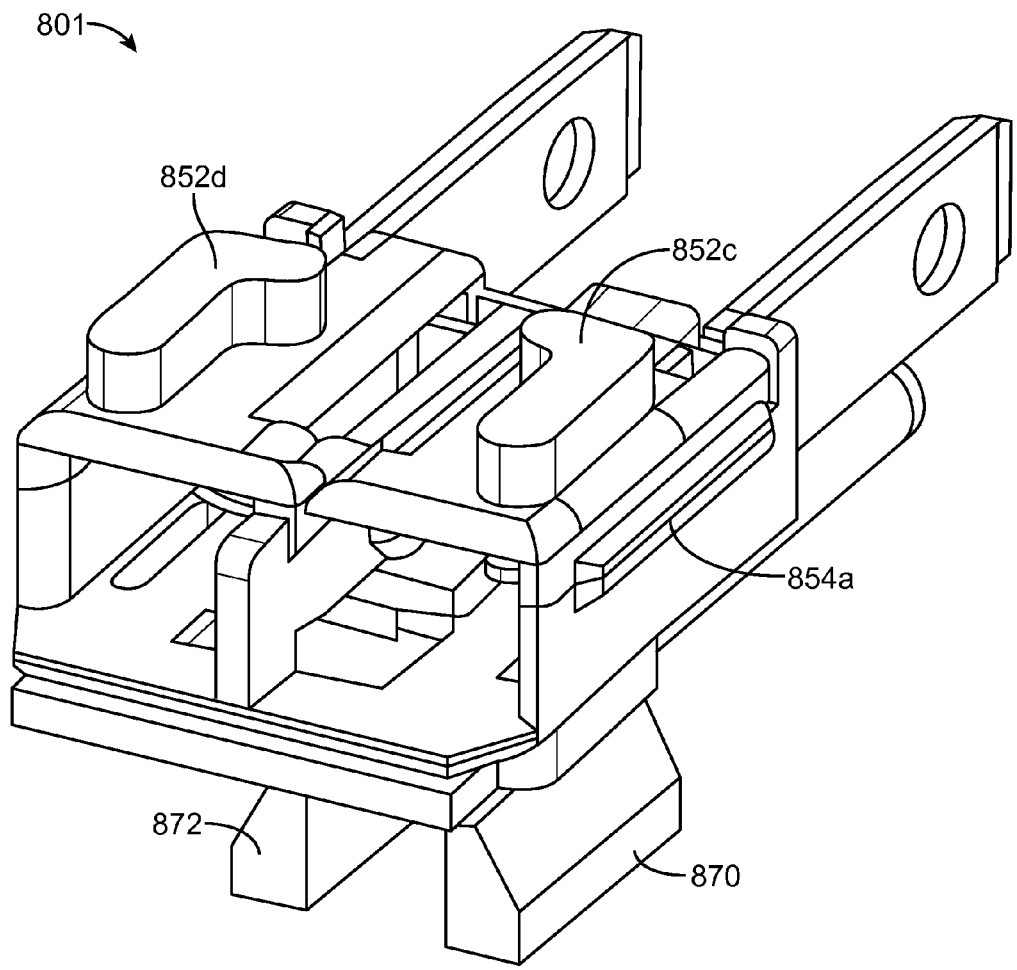
FIG. 17 is a top, perspective view of the two piece inner body in an embodiment.

During the assembly of the dual prong body 810 the ground pin body 850, the cavity 812 of the dual prong body 810 receives the platform 856 and the perpendicular arm 860 to secure the dual prong body 810 to the ground pin body 850. The arm 862 of the ground pin body 850 rests on the surface of the dual prong body 810 to provide further mechanical stability. FIGS. 16 and 17 are the bottom and top views of the dual prong body 810 engaged with the ground pin body.

Figure 18:
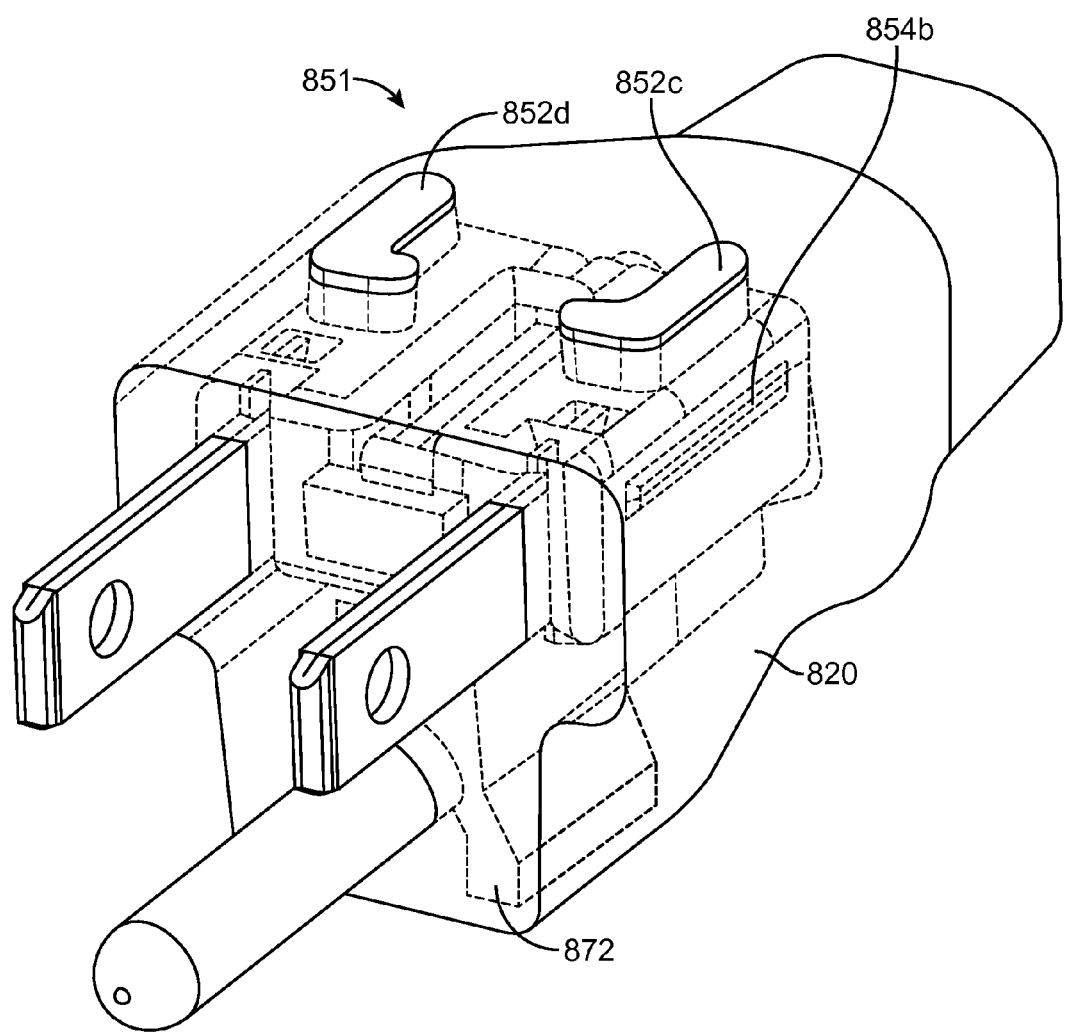
FIG. 18 is a front, perspective view of an overmolded, double insulated straight plug showing internal details.

FIG. 18 depicts the overmolded, double insulated plug 851 in one or more embodiments. The protrusions 852c and 852d and the protruding fingers 870 and 872 are flush with the overmold material 820 and serve to indicate orientation and evidence of a double insulated plug assembly. Moreover, the protrusions 852c and 852d and protruding fingers 870 and 872 may be employed to position and secure the two piece inner body 801 within a mold during the overmolding process describing below.

Figure 19:
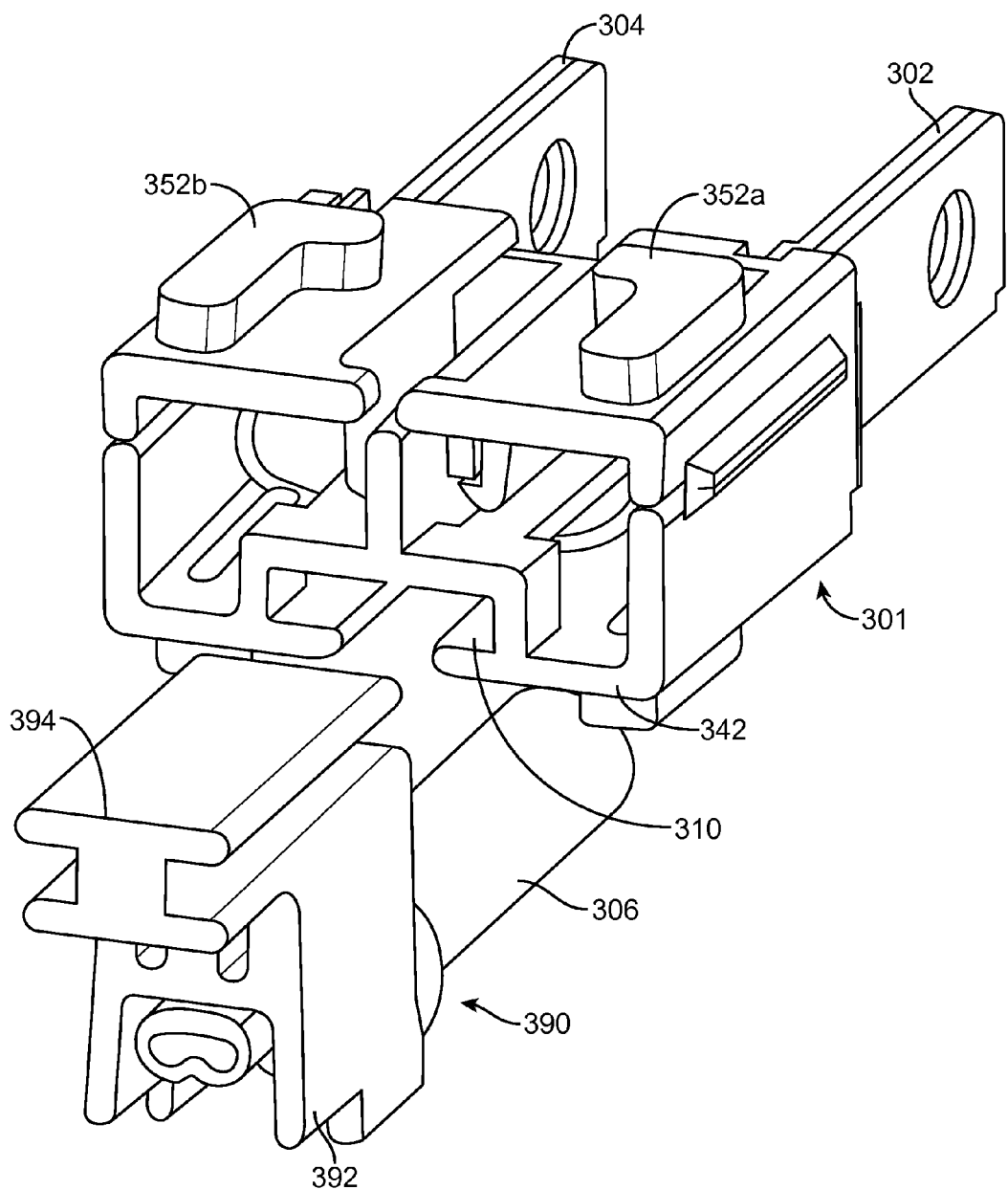
FIG. 19 is a rear, perspective view of an inner body receiving a ground plug assembly.

FIG. 19 is a rear, perspective view of an inner body 301 receiving a ground plug assembly 390 in one or more embodiments. The electrical plug 301 couples to a ground pin assembly 390. The ground pin assembly 390 is configured for engaging with the base 342. In an embodiment, the ground pin assembly 390 further comprises a T shaped rib 394, and the base 342 further comprises an outer track 310 shaped to receive the T shaped rib 394.

Figure 20:
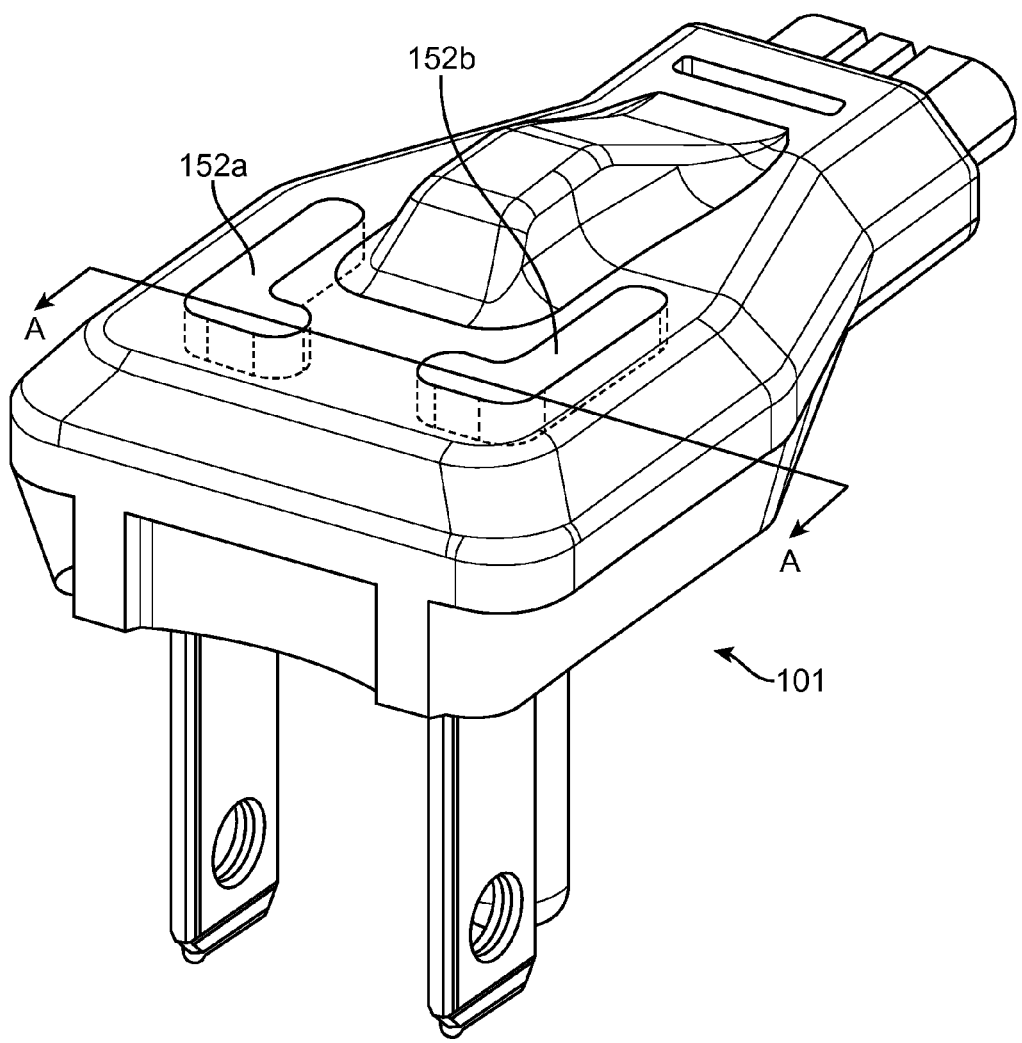
FIG. 20 is a front, perspective view of overmolded, double insulated plug showing internal details.
Figure 21:
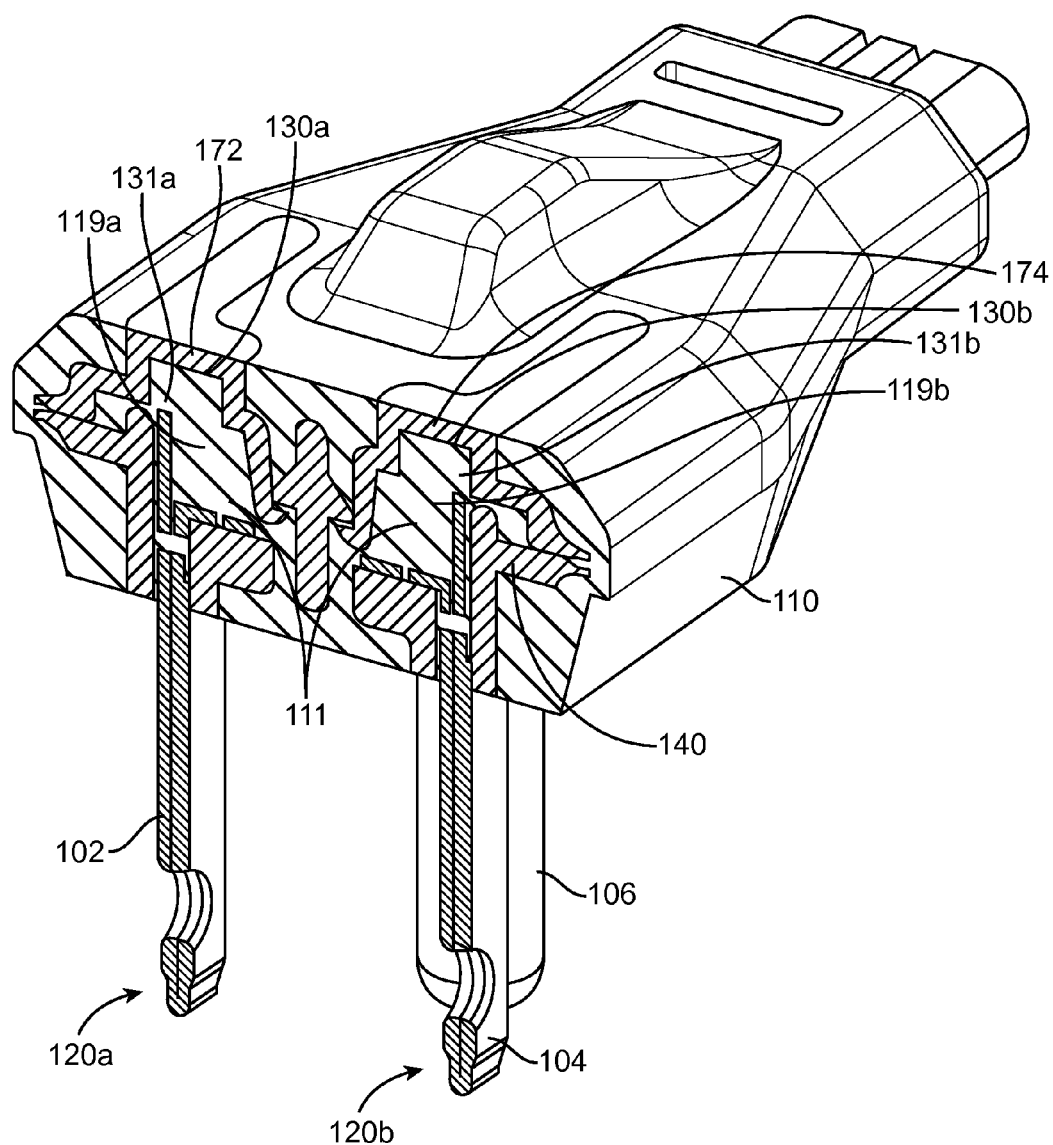
FIG. 21 is a cross-sectional view showing details of the inner body within the overmold.

FIG. 20 is a front, perspective view of an overmolded, double insulated plug 101 showing internal details. FIG. 21 is a cross-sectional view showing the inner body 140 within the overmolded plug. As discussed in greater detail below, the inner body 140 is placed in a mold, and molten material is injected into the mold. The molten material flows over the outside of the inner body 140, and also flows through the interiors 119a and 119b of the inner body 140 to form a void-free secondary insulation 111. As discussed above with respect to FIG. 6, cavities 130a and 130b are formed on the first cover 172 and second cover 174 respectively. The cavities 130a and 130b are on opposite surfaces of the protrusions 152a and 152b respectively. When assembled, a gap exists between the covers 172 and 174 and the electrical connectors 120a and 120b. Overmold material 131a and 131b fill the cavities 130a and 130b during the overmold process to ensure that the electrical connectors 120a and 120b are double insulated. In other words, a shorting electrical current must pass through materials of both the inner body 140 and the overmold material. As discussed above with respect to FIG. 9, a similar configuration for ensuring double insulation of the electrical connectors 331a and 331b is contemplated in one or more embodiments for a straight plug.

Figure 22:
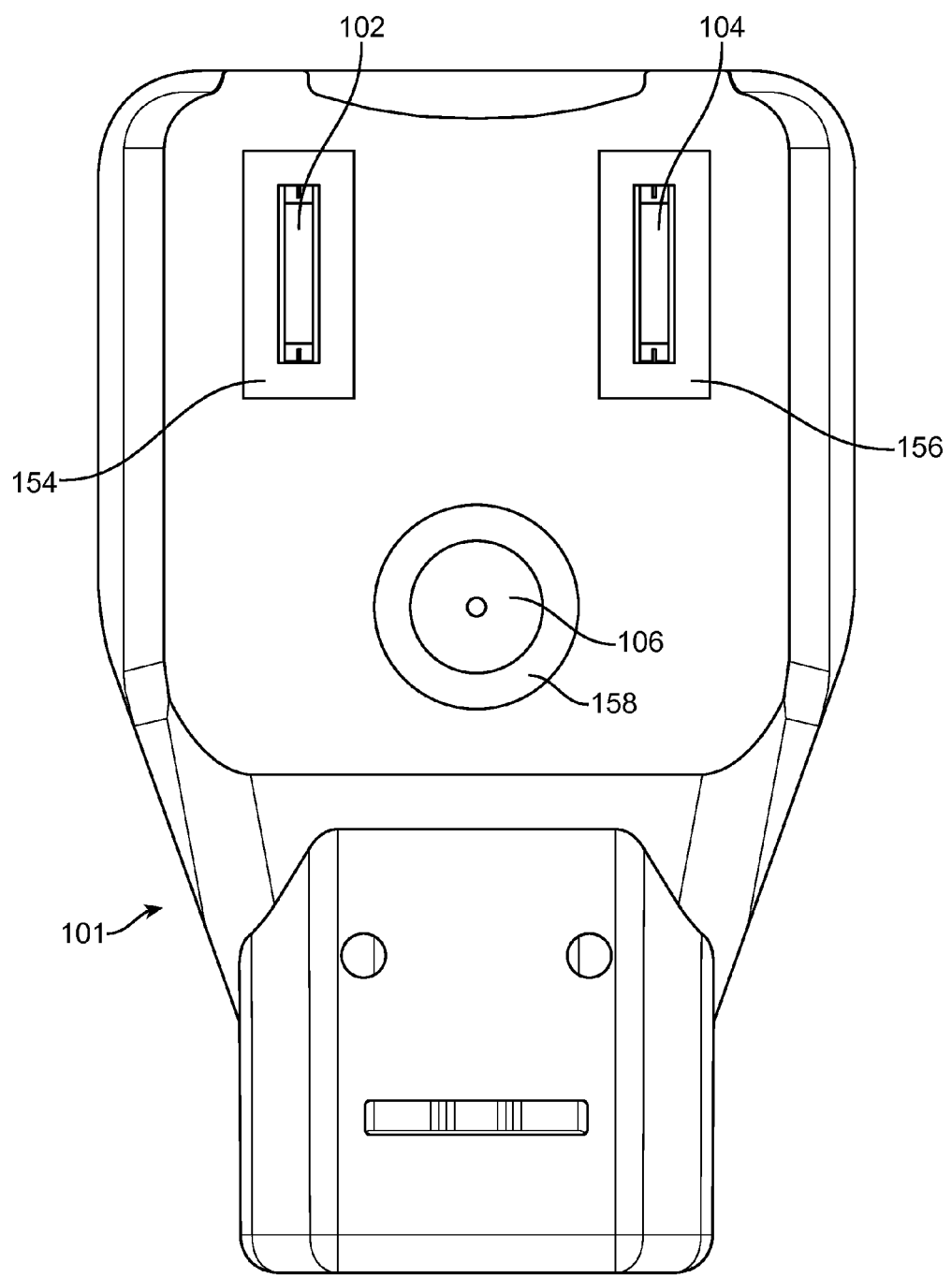
FIG. 22 is a view of the bottom surface of the overmolded plug.

FIG. 22 is a view of the bottom surface of the overmolded plug. The eyelet shoulders 154, 156, and 158 which surround prongs 102, 104, and 106 are also covered during the injection molding process and remain visible.

Figure 23:
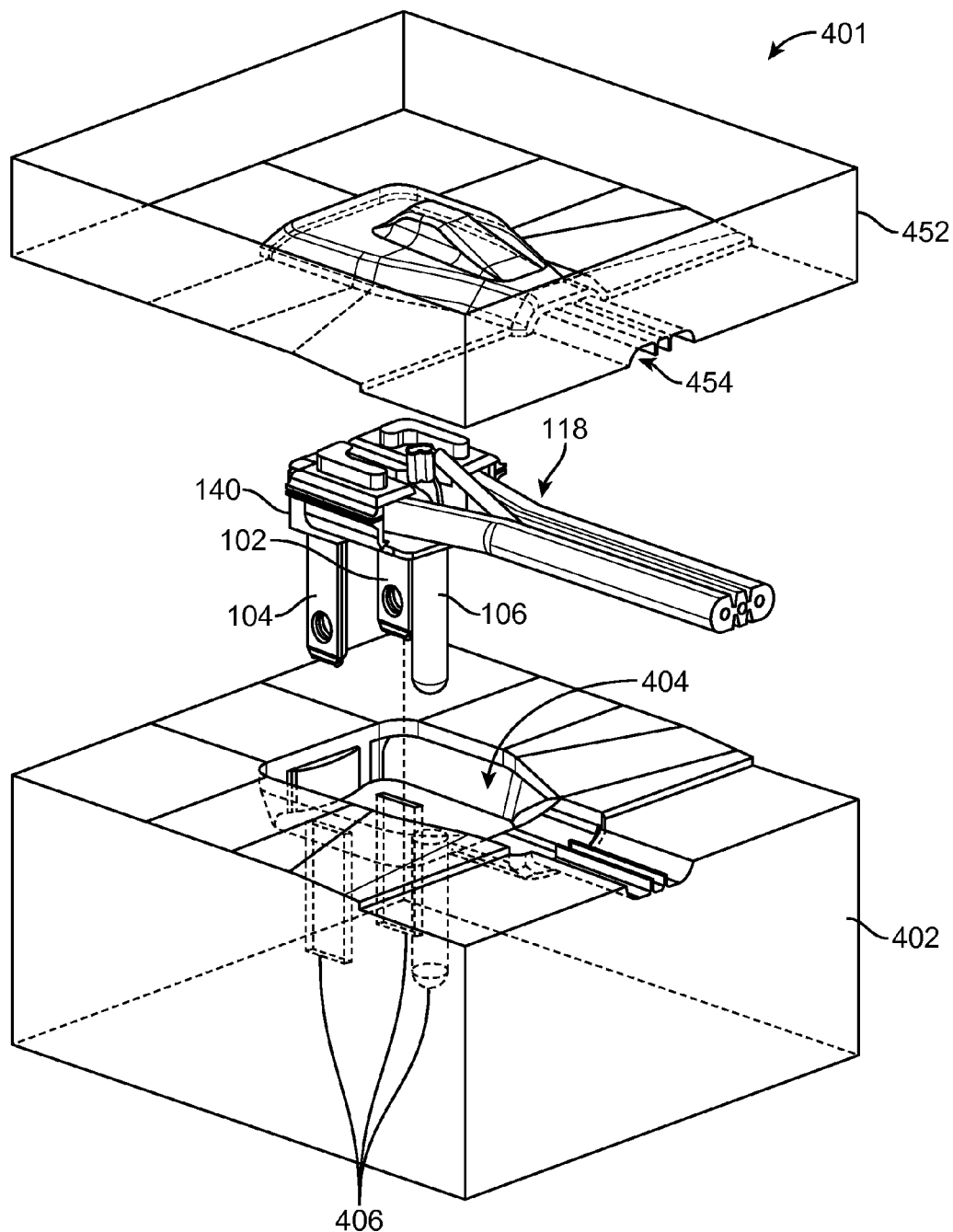
FIG. 23 is an exploded, perspective view of an inner body and wire assembly being placed in a mold system.

FIG. 23 is an exploded, perspective view of an injection mold system 401. The mold system 401 has a top mold block 452 having a top mold block 452 and a bottom mold block 402. The top mold block 452 has a top mold cavity 454 shaped to correspond to the desired shape of the upper portion of an overmolded electric plug 101. The bottom mold block 402 has a bottom mold cavity 404 shaped to correspond to the desired shape of the bottom portion of the overmolded electric plug 101. The bottom mold block 402 may be shaped as a socket having female sockets 406 to receive and detachably secure an inner body 140 having protruding electrical prongs 102, 104, and 106.

Figure 24:
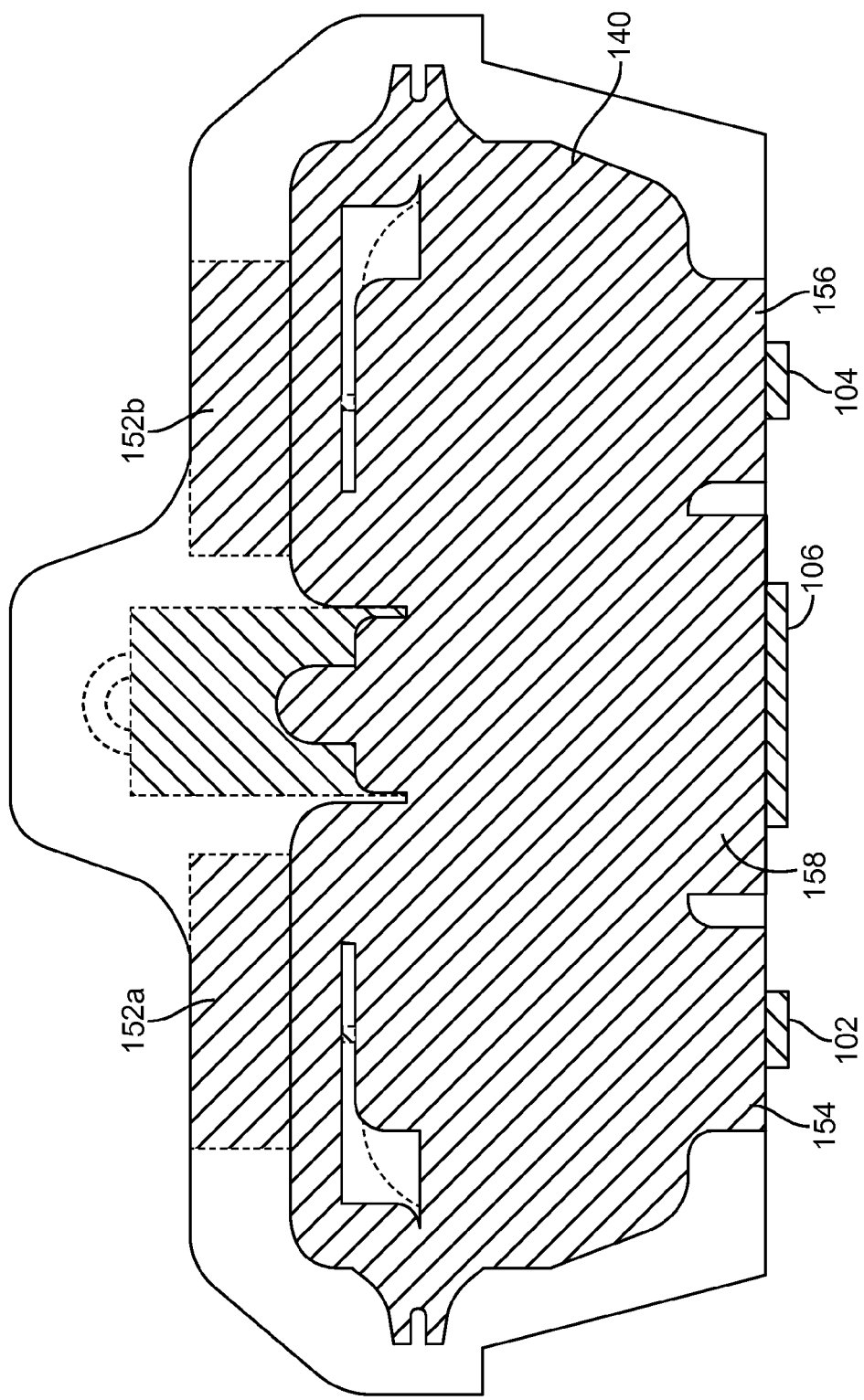
FIG. 24 is a cross sectional view of the inner body in the mold system illustrating that the inner body is aligned within the mold system by the protrusions, eyelet shoulders, and the electrical prongs.
Figure 25:
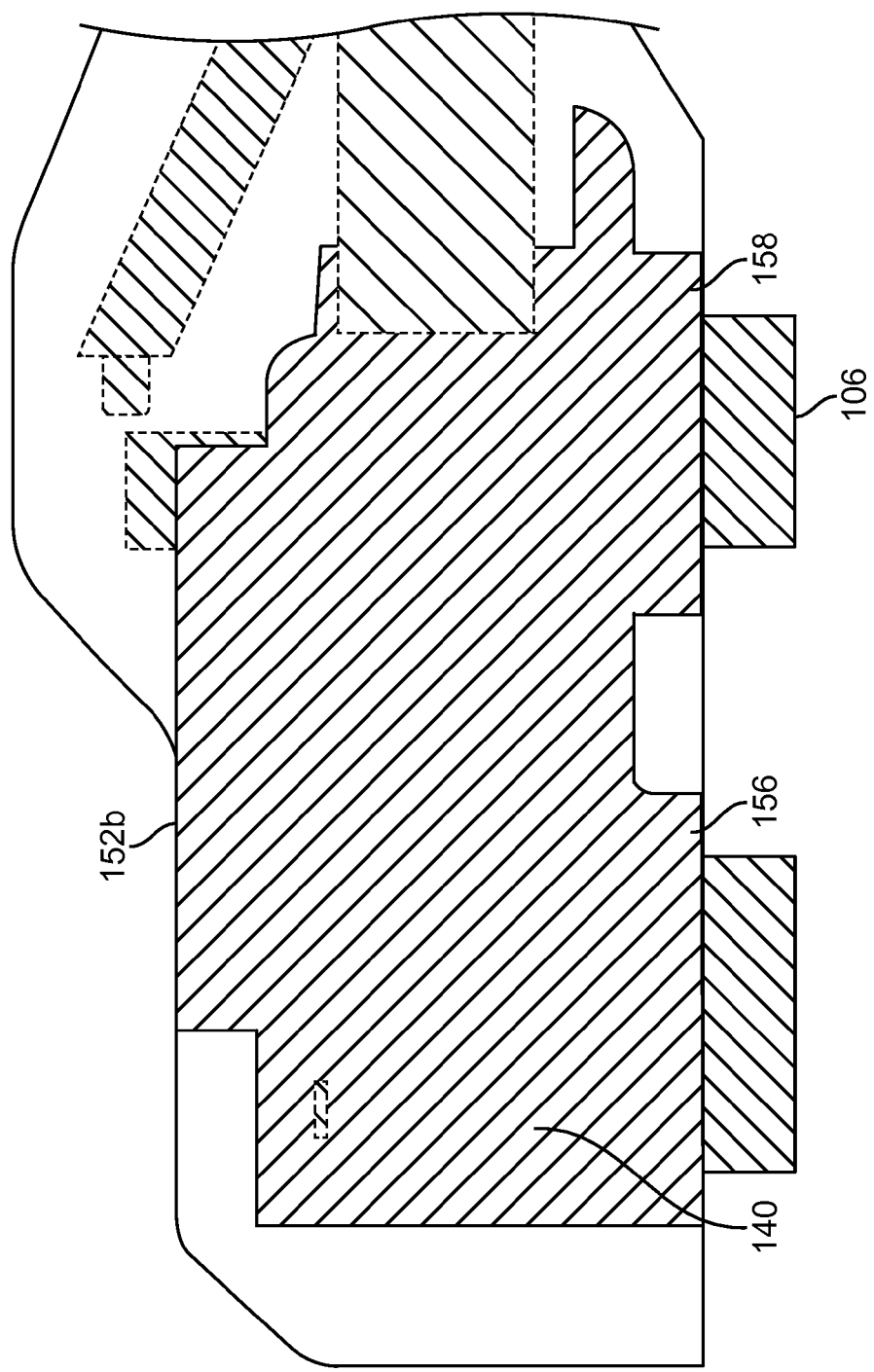
FIG. 25 is a cross sectional view of the side of the inner body in the mold system.
Figure 26:
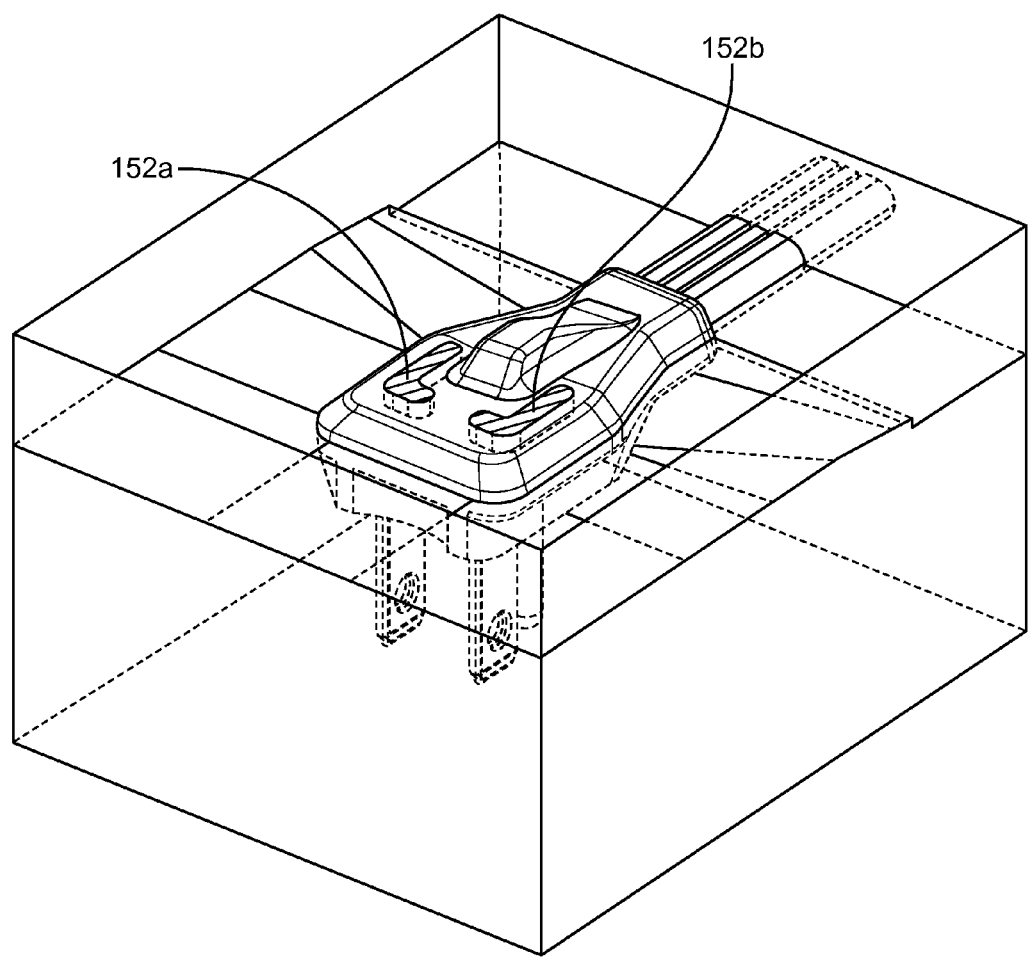
FIG. 26 is a representation of the mold system receiving and sealing the protrusion of the inner body from molten material during the injection mold process.

FIGS. 24 and 25 are cross sectional views of the inner body 140 secured within the top and bottom mold blocks 452 and 402. The top mold block 452 is shaped to receive the protrusions 152a and 152b to protect these surfaces from the molten material as illustrated in FIG. 26. The bottom mold block 402 is also shaped to receive the eyelet shoulders 154, 156, and 158 to protect these surfaces from the molten material.

The eyelet shoulders 154, 156, and 158 and the protrusions 152a and 152b serve several functions. First, these features precisely align and engage the inner body 140 within the mold cavities 404 and 454, which may improve the quality and consistency of the electric plugs 101. Flat electrical plugs are held in place by two large faces of the plug, and straight plugs are held in place by 3 large faces of the plug body. This approach does not require mold insertion pins to align the inner body 140 within the mold cavities 404 and 454. Second, these features provide visible evidence that the electric plug 101 is double insulated where two forms of insulating barriers prevent shorting of the electric plug 101. Moreover, the protrusions 152a and 152b serve to provide a visible indication of the orientation of the electric plug 101.

Figure 27:
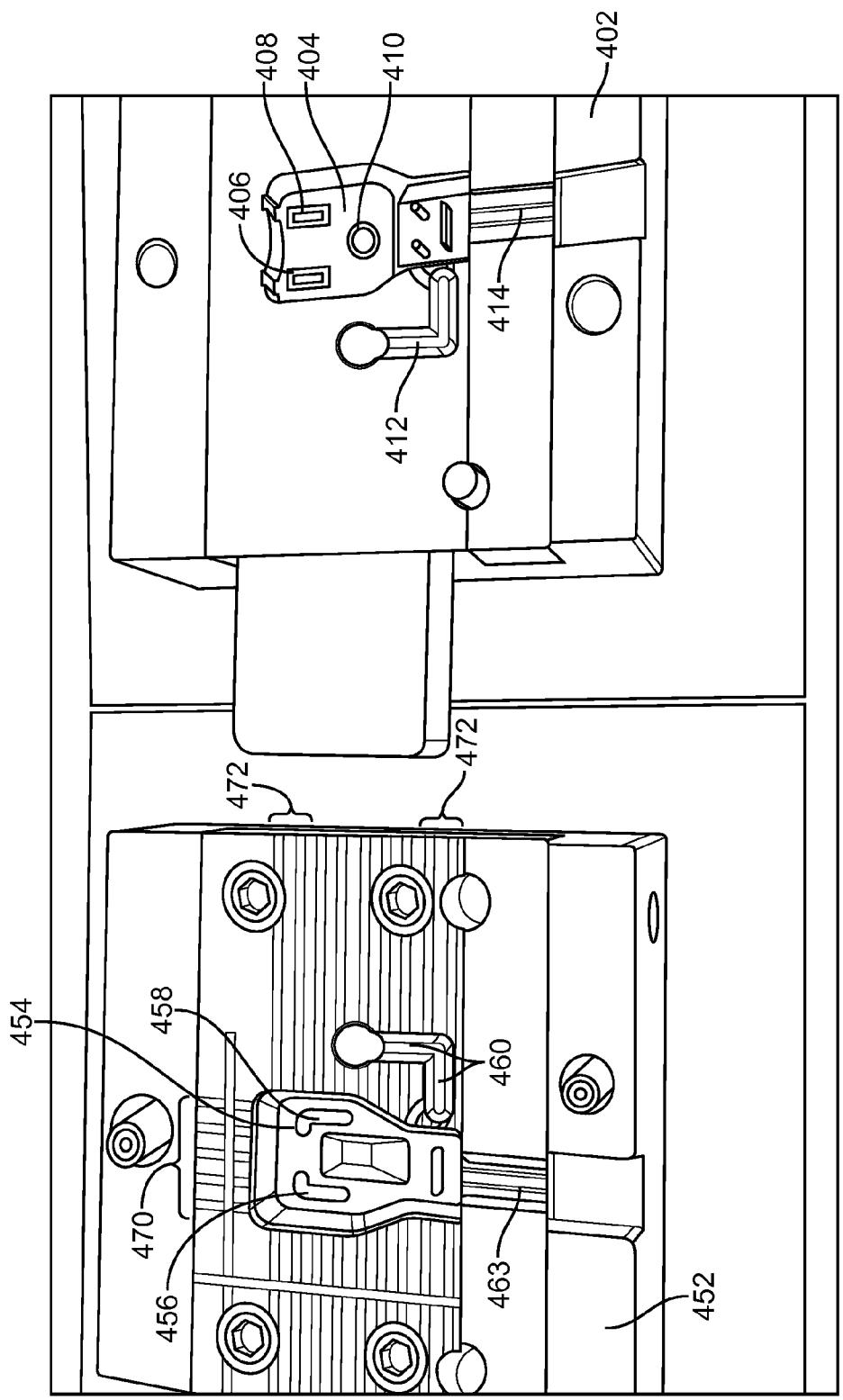
FIG. 27 is a top, perspective view of the mold system in an embodiment.
Figure 28:
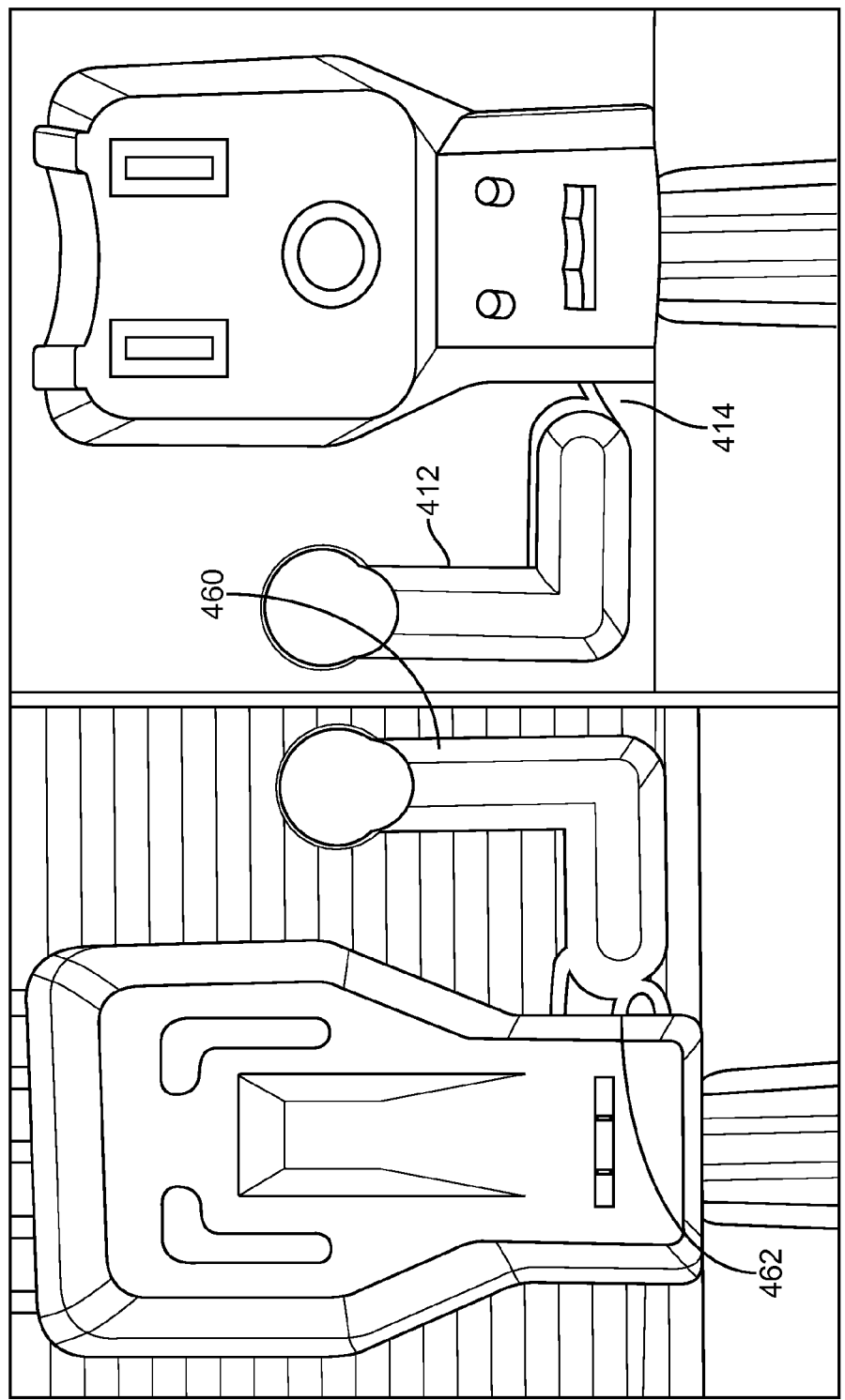
FIG. 28 is a top, perspective view showing details of the mold system.

FIGS. 27 and 28 illustrate the mold system 401 in greater detail. Bottom mold block 402 has a mold cavity 404 shaped to the bottom portion of the inner body 140. Bottom mold cavity 404 has flush surface or recessed areas 406, 408, 410 which receive the eyelet shoulders 154, 156, and 158 forming a seal to prevent molten material from being deposited on the eyelet shoulders 154, 156, and 158. Bottom mold cavity 404 also has a recessed portion 414 for securing the electric cord 114. Bottom mold cavity 404 has a bottom runner 412 and an injection gate 414 which feed the molten material into the cavities 404 and 454.

The top mold block 452 has a top mold cavity 454 shaped to form the top portion of the inner body 140. The top mold cavity 454 has flush surface or recesses 456 and 458 which receive the protrusions 152a and 152b of the inner body forming a seal to prevent molten material from being deposited on those surfaces. The top mold cavity 454 has recessed portion 463 for securing the electric cord 114. The top mold cavity 454 has a runner 460 and an injection gate 462 for injecting molten materials into the cavities 404 and 454. The top mold block 452 has a plurality of vertical channel escape paths 470 and a plurality of horizontal channel escape paths 472.

Figure 29:
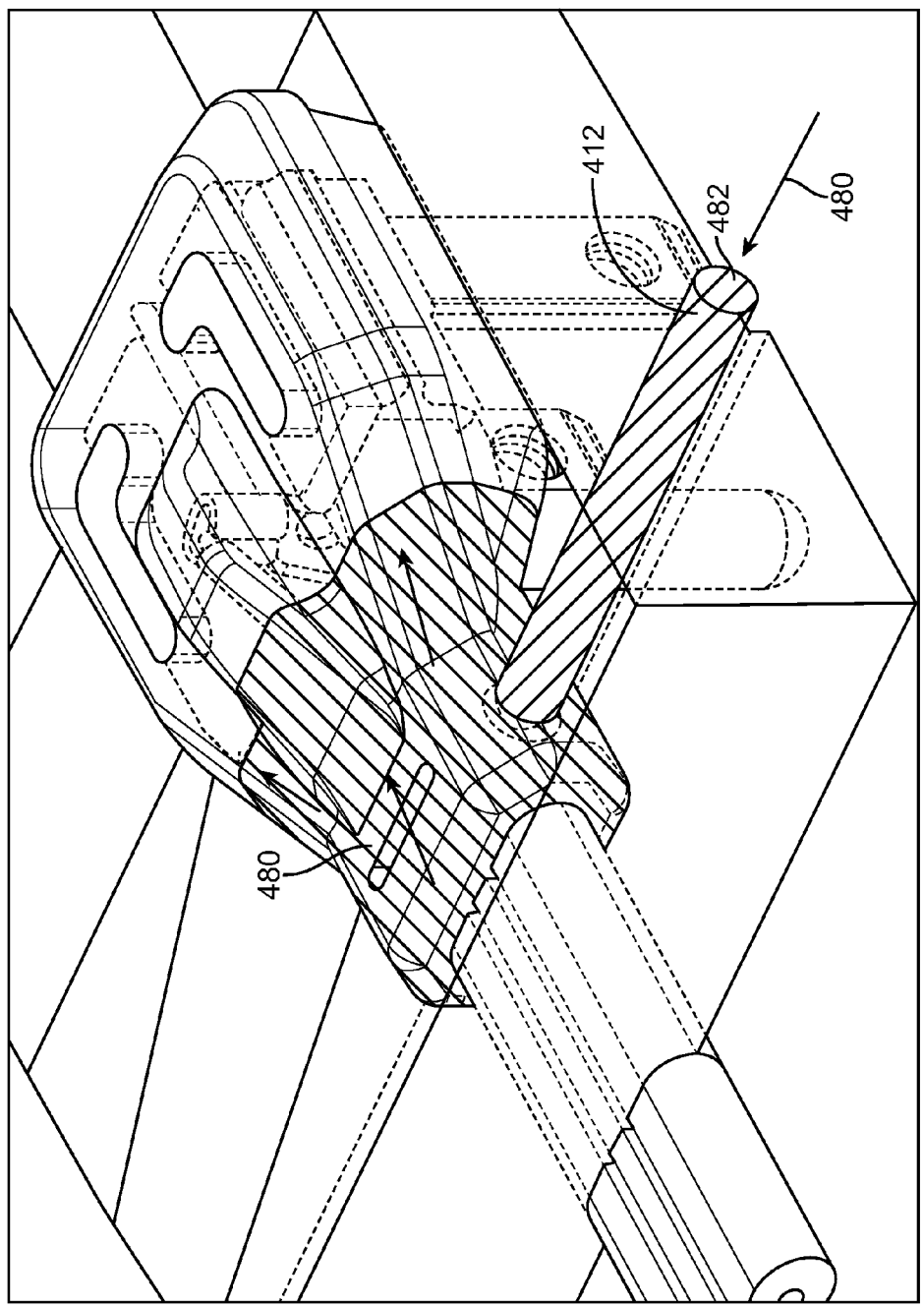
FIG. 29 is a top, perspective representation of the molten material being injected into the mold system.
Figure 30:
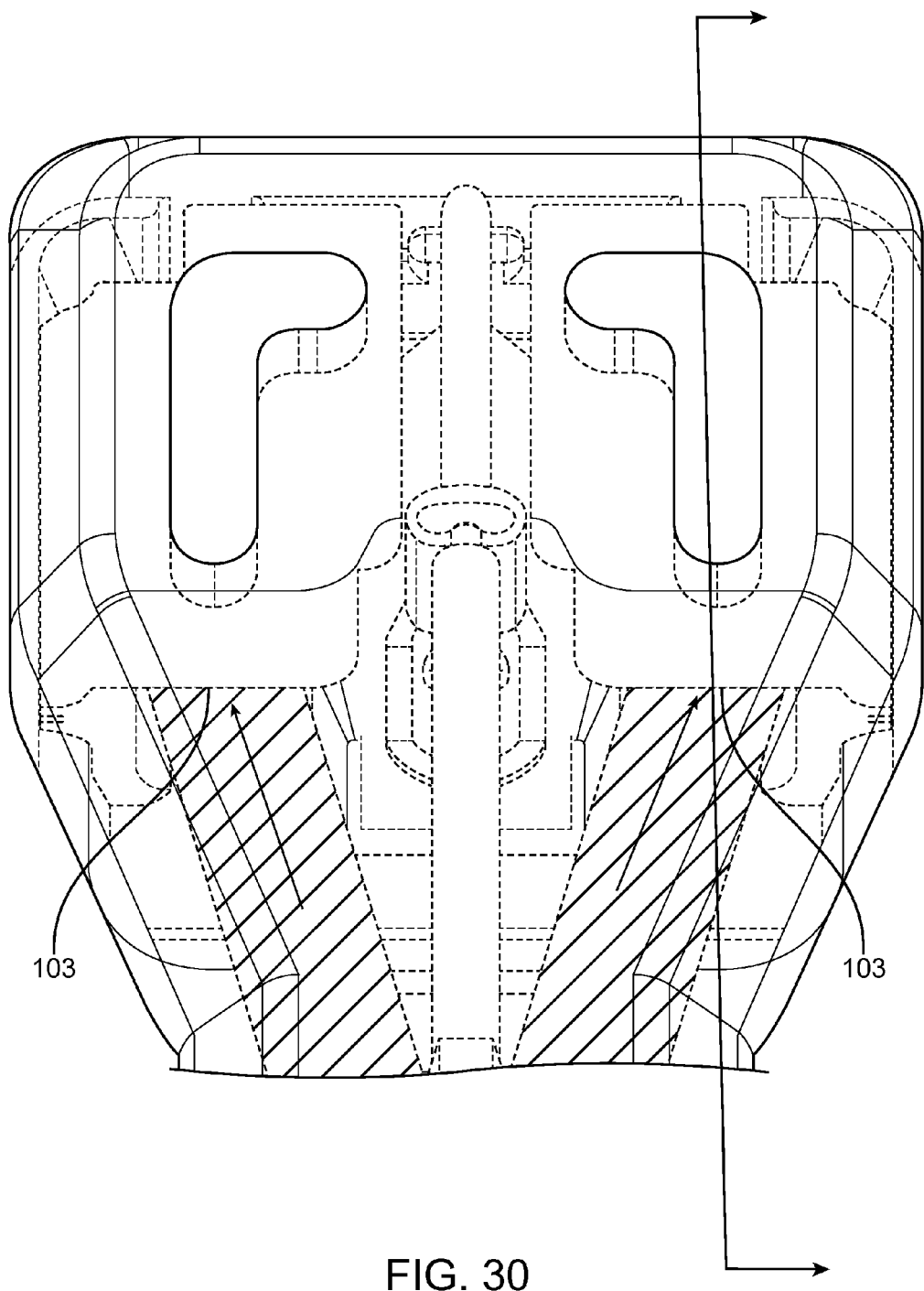
FIG. 30 is a top, perspective view of the molten material entering the feed vents of the inner body.
Figure 31:
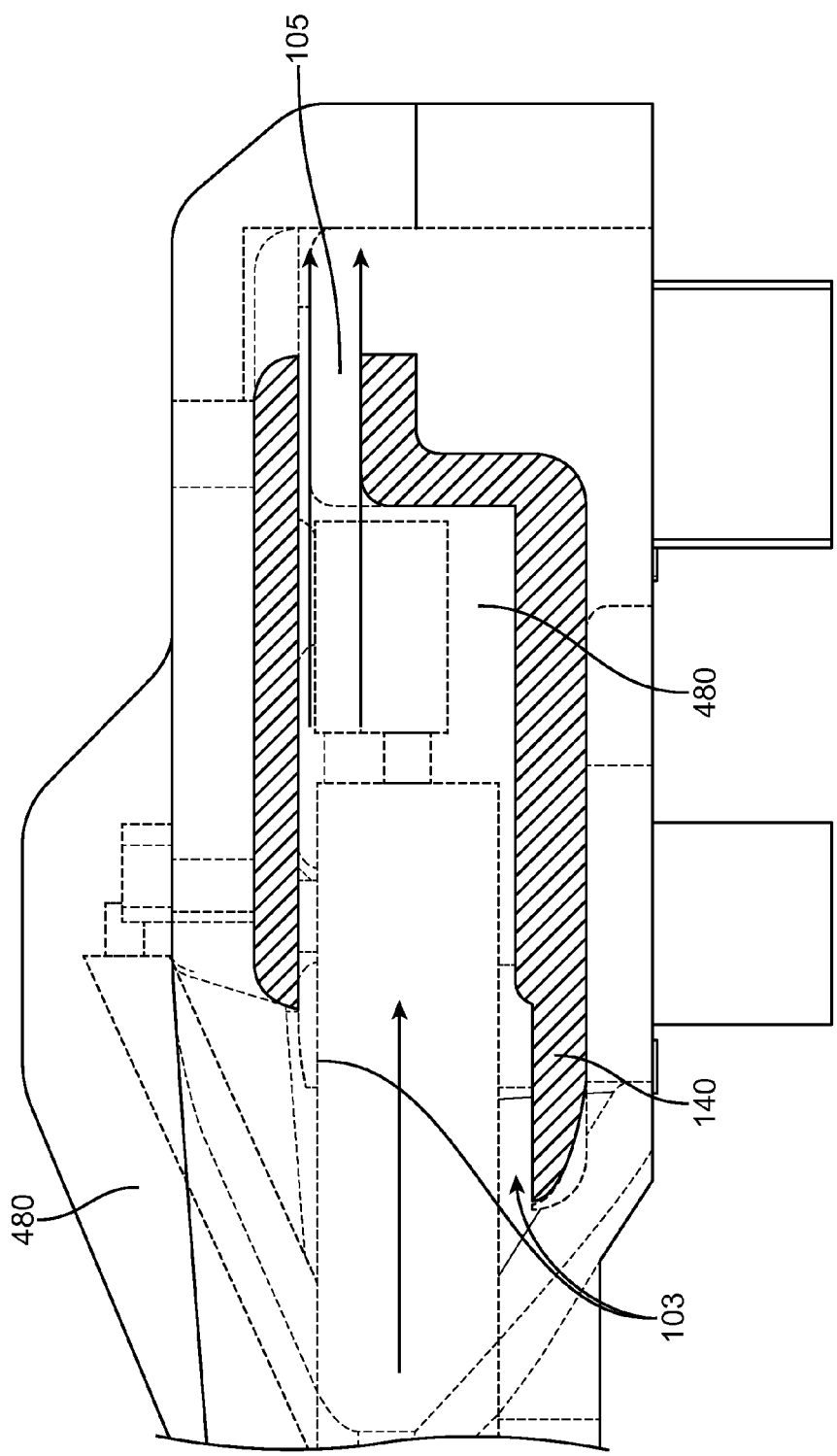
FIG. 31 is a cross sectional view of the inner body in the mold system, where the interior of the inner body is receiving molten material.

FIGS. 29-31 depict the flow of the molten material during the injection molding process. FIG. 29 shows that the top mold block 402 is placed over bottom mold block 454. The runners 412 and 460 form an injection path 482 which feeds the molten material 480 into the mold cavities 404 and 454. FIG. 29 shows the mold material 480 entering the combined mold cavities 404 and 454. The molten material covers the unprotected surfaces of the inner body 140, pushes the air within the cavities 404 and 454 out the vertical and horizontal escape channels 470 and 472.

In addition to covering the outer surfaces of the inner body 140, the molten material 480 also fills the interior of the inner body 140. As shown in FIGS. 30 and 31, the inner body 140 has feed vents 103 receiving the molten material and escape vents 105 for releasing the air contained in the inner body 140. The vents 103 and 105 allows for axial flow of the molten material to flow into the interiors in the same direction as the wire, which reduces stress on the crimp connection of the contact to the wire. In one or more embodiments, the cross sectional area of the feeding vents 103 is greater than that of the escape vents 105. This may allow gas to escape and the molten material to fully fill the cavities without trapping air and creating voids in the inner body 140. Once the molten material 480 has cooled, the top mold block 452 is separated from the bottom mold cavity to reveal an overmolded electric plug 101.

Figure 32:
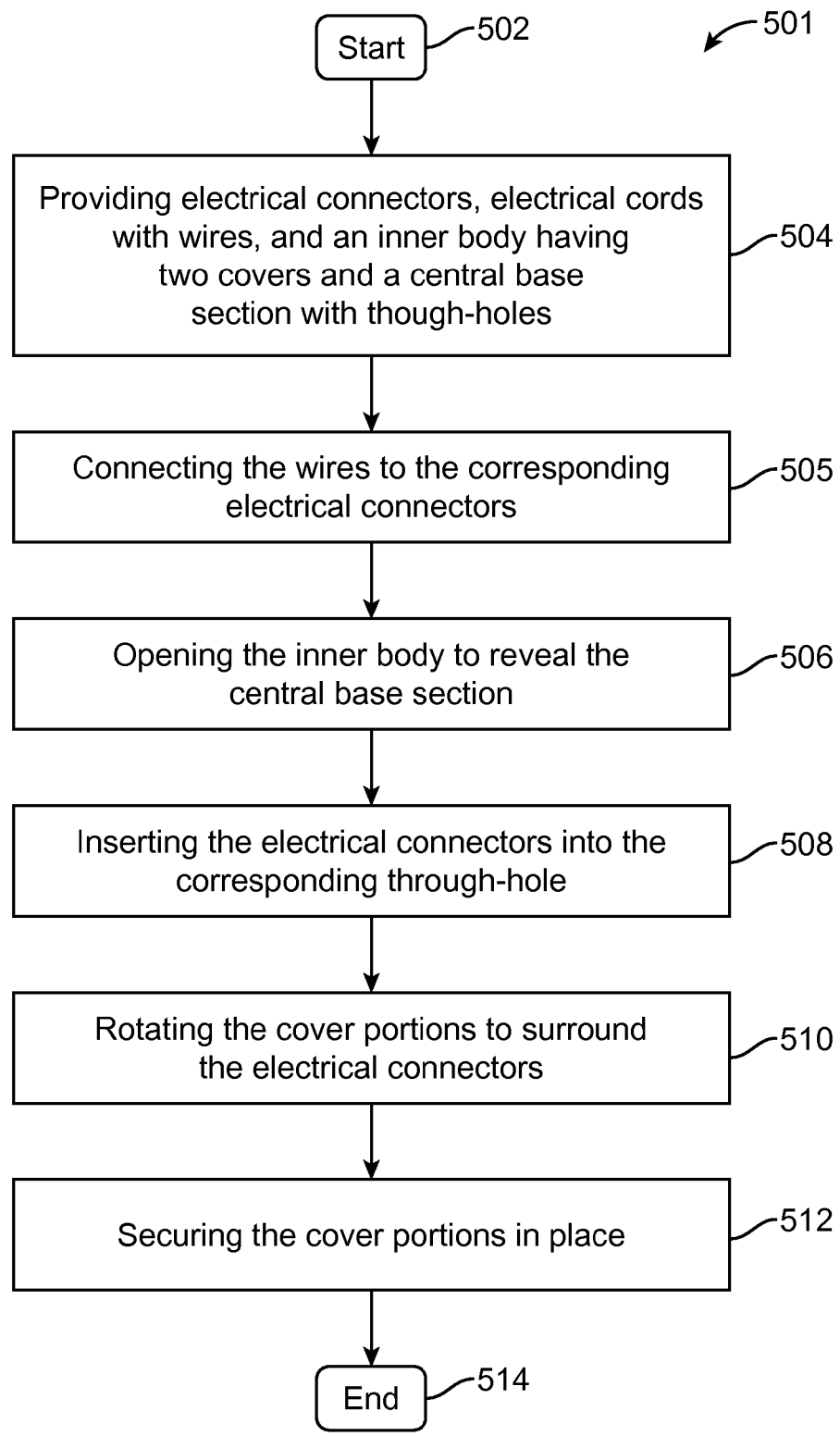
FIG. 32 is a representative flow chart illustrating an exemplary process for assembling an inner body.

FIG. 32 depicts a flow chart illustrating an exemplary process 501 for assembly the wire assembly 118 into the inner body 140. The process begins at step 502. Electrical connectors such as 120a-120c having a prong section, a mounting tab section 108, and a wire connector section 117 are provided. An electrical cord comprising at least two electrical wires such as 116a-116c, and an insulating body 140 having a central portion having cavities and through-holes 164, 166, and 168 for receiving electrical connectors and two cover portions both adjacent to the central portion, each configured for pivoting about axes are provided (step 504). The wires 116 are connected to the corresponding electrical connectors 120 (step 506). The inner body 140 is opened to reveal the central base 142 portion (step 506). Electrical connectors are inserted into the corresponding through-hole (step 508). The cover portions 172 and 174 are rotated to surround the electrical connectors 120 (step 510). And the cover portions 172 and 174 are secured in place (step 512). The process ends at step 514.

Figure 33:
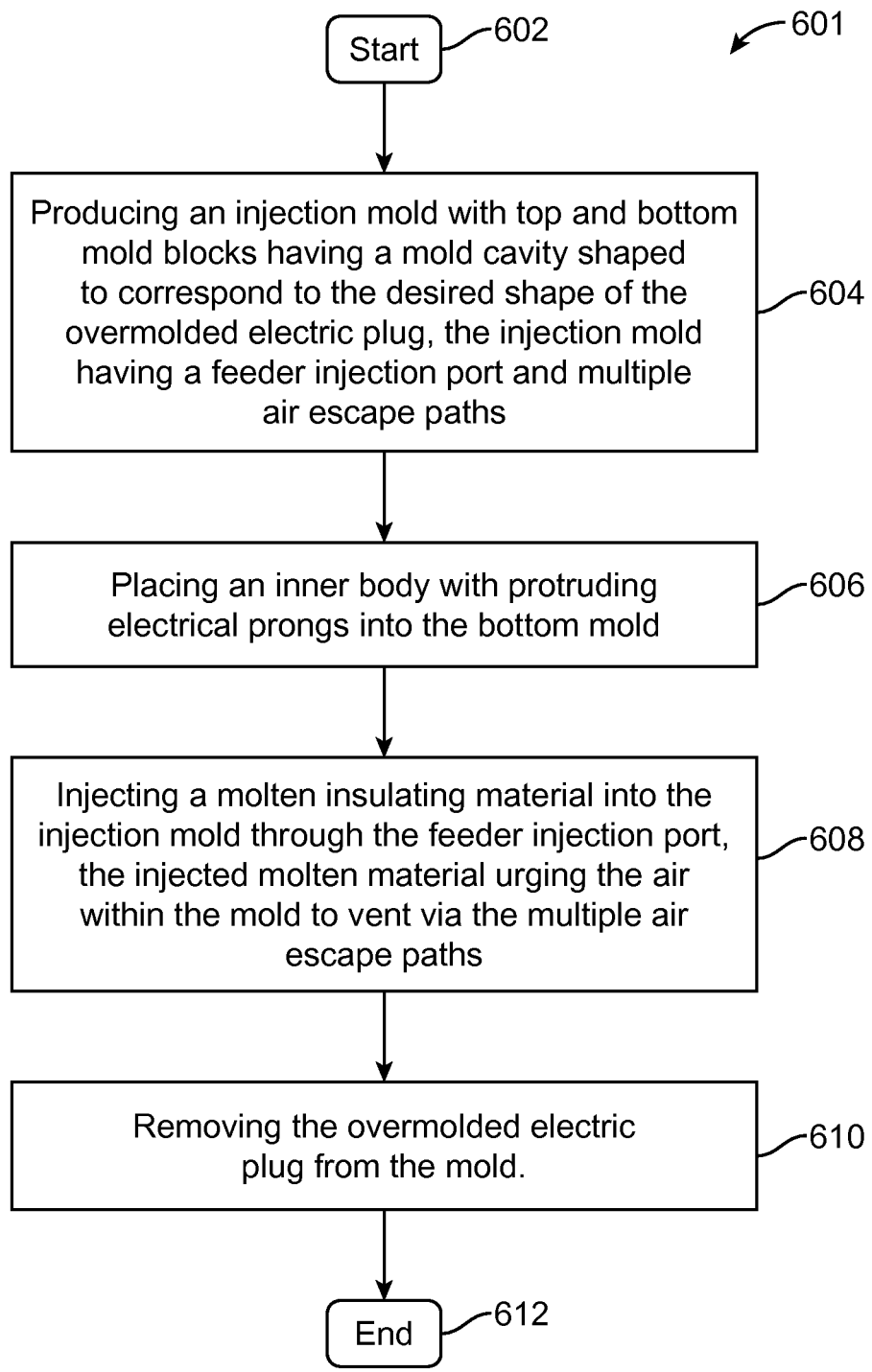
FIG. 33 is a representative flow chart illustrating an exemplary process for forming an overmolded body.

FIG. 33 is a representative flow chart illustrating the process 601 for forming an overmolded body. The process begins at step 602. An injection mold 401 comprising a top mold block 452 and a bottom mold block 402 is provided, the injection mold having a mold cavity 404 and 454 are shaped to correspond to the desired shape of the overmolded electric plug 101, the bottom mold block 402 is shaped to receive and detachably secure an inner body 140 having protruding electrical prongs; the injection mold having a feeder injection port 414 and 462 and multiple air escape paths (step 604). An inner body with protruding electrical prongs is placed into the bottom mold (step 606). Molten insulating material is injected into the injection mold through the feeder injection port, the injected molten material urging the air within the mold to vent via the multiple air escape paths 470 and 472 (step 608). The overmolded electric plug is removed from the mold (step 610). The process ends at step 612.

Figure 34:
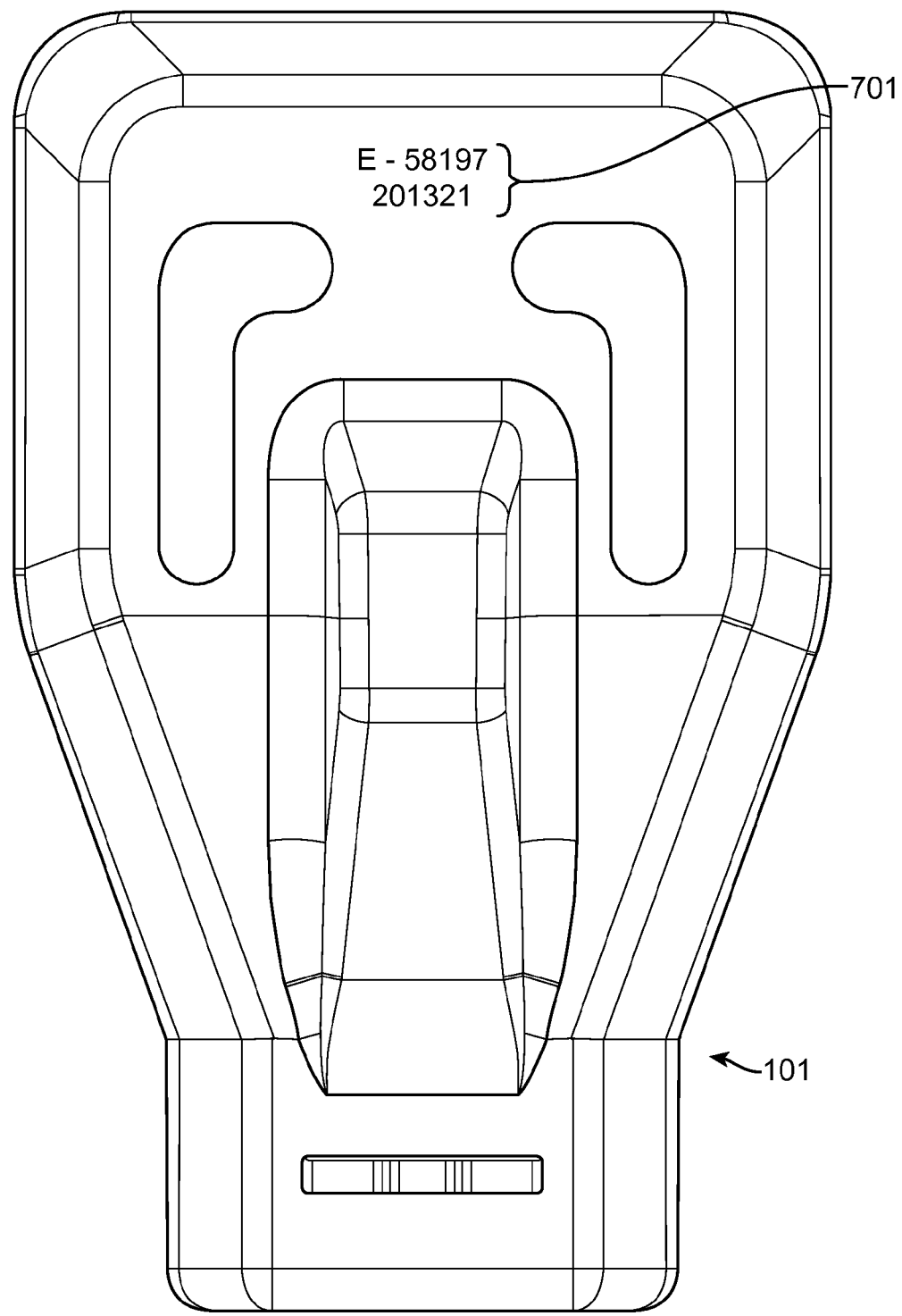
FIG. 34 is a bottom view of traceability information etched into the bottom surface of the electric plug.

In one or embodiments, the overmolded electric plug 101 is tested. As shown in FIG. 34, if the electric plug 101 passes the test, a permanent marking or etching 701 by a laser is applied to plug to identify manufacturer and manufacturing information such as date code, manufacturing line number, and so forth.

Although the invention has been discussed with reference to specific embodiments, it is apparent and should be understood that the concept can be otherwise embodied to achieve the advantages discussed. The preferred embodiments above have been described primarily as electrical plugs, overmolded electrical plugs, and the manufacture thereof. While the embodiments described above refer to electrical plugs and inner bodies, it shall be understood that other electrical connectors are also contemplated in one or more embodiments. In this regard, the foregoing description of the system and methods is present for purposes of illustration and description. Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. A method for manufacturing an overmolded electric plug, comprising:
   producing an injection mold comprising a top mold block and a bottom mold block, the injection mold having a mold cavity shaped to correspond to the desired shape of the overmolded electric plug, the bottom mold block shaped to receive and detachably secure an inner body assembly having protruding electrical prongs; the injection mold having a feeder injection port and multiple air escape paths;
   placing an inner body assembly with protruding electrical prongs into the bottom mold, injecting a molten insulating material into the injection mold through the feeder injection port, the injected molten material urging the air within the mold to vent via the multiple air escape paths; and,
   removing the overmolded electric plug from the mold, wherein
   the inner body assembly further comprises one or more protrusions projecting outward and away from the top of the inner body assembly; and,
   the upper mold block is shaped to receive the protrusions and form a seal surrounding the protrusions to prevent the molten material from depositing on the top surface of the protrusions.

2. The method for manufacturing an overmolded electric plug of claim 1, wherein:
   the inner body assembly further comprises feeding vents for receiving molten insulating material and escape vents for releasing air from the inner body assembly; and,
   urging the air within the mold to vent further comprises urging the air within the inner body assembly and air surrounding the inner body to vent via the multiple air escape paths.

3. The method for manufacturing an overmolded electric plug of claim 2, wherein the feeding and the escape vents are positioned on opposite sides of the inner body assembly separated parallel with the wires entering the inner body assembly.

4. The method for manufacturing an overmolded electric plug of claim 2, wherein a cross sectional area of the feeding vents is greater than that of the escape vents.

5. The method for manufacturing an overmolded electric plug of claim 1, wherein one of the protrusions is "L" shaped and the other of the protrusions is a reflection of the "L" shape.

6. The method for manufacturing an overmolded electric plug of claim 5, wherein marking the overmolded electric plug further comprises marking the overmolded electric plug with traceability information.

7. The method for manufacturing an overmolded electric plug of claim 1,
   the inner body assembly further comprises at least two eyelet shoulders surrounding the electrical prong proximal to the inner body assembly and projecting outward and away from the inner body assembly; and,
   the lower mold block is shaped to receive the eyelet shoulders and form a seal surrounding the eyelet shoulders to prevent the molten material from depositing on the outer surface of the eyelet shoulders.

8. The method for manufacturing an overmolded electric plug of claim 1, further comprising:
   testing the overmolded electric plug; and,
   marking the overmolded electric plug with laser.

9. A method for manufacturing an overmolded electric plug, comprising:
   producing an injection mold comprising a top mold block and a bottom mold block, the injection mold having a mold cavity shaped to correspond to the desired shape of the overmolded electric plug, the bottom mold block shaped to receive and detachably secure an inner body assembly having protruding electrical prongs; the injection mold having a feeder injection port and multiple air escape paths;

providing a wire assembly comprising an electrical cord having at least two wires and at least two electrical connectors each having an electrical prong;

providing a one-piece inner body assembly comprising:
a base having one or more latching mechanisms and a plurality of cavities, each of the plurality of cavities having an aperture for receiving a corresponding electrical prong;
a first cover hingably coupled to the base on a first side of the base,
a second cover hingably couple to the base on a second side of the base, the second side of the base opposite that of the first side of the base;

positioning the wire assembly into the base;

rotating the first and second cover over the base;

coupling the first and second cover to the latching mechanism of the base;

placing the inner body assembly with protruding electrical prongs into the bottom mold, injecting a molten insulating material into the injection mold through the feeder injection port, the injected molten material urging the air within the mold to vent via the multiple air escape paths; and, removing the overmolded electric plug from the mold, wherein the inner body assembly further comprises one or more protrusions projecting outward and away from the top of the inner body assembly; and, the upper mold block is shaped to receive the protrusions and form a seal surrounding the protrusions to prevent the molten material from depositing on the top surface of the protrusions.

10. The method for manufacturing an overmolded electric plug of claim 9, wherein:

the inner body assembly further comprises feeding vents for receiving molten insulating material and escape vents for releasing air from the inner body assembly; and, urging the air within the mold to vent further comprises urging the air within the inner body assembly and air surrounding the inner body to vent via the multiple air escape paths.

11. The method for manufacturing an overmolded electric plug of claim 10, wherein the feeding and the escape vents are positioned on opposite sides of the inner body assembly separated parallel with the wires entering the inner body assembly.

12. The method for manufacturing an overmolded electric plug of claim 9, wherein one of the protrusions is "L" shaped and the other of the protrusions is a reflection of the "L" shape.

13. The method for manufacturing an overmolded electric plug of claim 9, the inner body assembly further comprises at least two eyelet shoulders surrounding the electrical prong proximal to the inner body assembly and projecting outward and away from the inner body assembly; and, the lower mold block is shaped to receive the eyelet shoulders and form a seal surrounding the eyelet shoulders to prevent the molten material from depositing on the outer surface of the eyelet shoulders.

14. The method for manufacturing an overmolded electric plug of claim 9, further comprising:

testing the overmolded electric plug; and, marking the overmolded electric plug with laser with traceability information.

15. A method for manufacturing an overmolded electric plug, comprising:

producing an injection mold comprising a top mold block and a bottom mold block, the injection mold having a mold cavity shaped to correspond to the desired shape of the overmolded electric plug, the bottom mold block shaped to receive and detachably secure an inner body assembly having protruding electrical prongs; the injection mold having a feeder injection port and multiple air escape paths;

placing an inner body assembly with protruding electrical prongs into the bottom mold, injecting a molten insulating material into the injection mold through the feeder injection port, the injected molten material urging the air within the mold to vent via the multiple air escape paths; and, removing the overmolded electric plug from the mold, wherein the inner body assembly further comprises at least two eyelet shoulders surrounding the electrical prong proximal to the inner body assembly and projecting outward and away from the inner body assembly; and, the lower mold block is shaped to receive the eyelet shoulders and form a seal surrounding the eyelet shoulders to prevent the molten material from depositing on the outer surface of the eyelet shoulders.

16. The method for manufacturing an overmolded electric plug of claim 15, wherein:

the inner body assembly further comprises feeding vents for receiving molten insulating material and escape vents for releasing air from the inner body assembly; and, urging the air within the mold to vent further comprises urging the air within the inner body assembly and air surrounding the inner body to vent via the multiple air escape paths.

17. The method for manufacturing an overmolded electric plug of claim 16, wherein the feeding and the escape vents are positioned on opposite sides of the inner body assembly separated parallel with the wires entering the inner body assembly.

18. The method for manufacturing an overmolded electric plug of claim 16, wherein a cross sectional area of the feeding vents is greater than that of the escape vents.

* * * * *